US 11,582,690 B2

(12) United States Patent
Phuyal et al.

(10) Patent No.: US 11,582,690 B2
(45) Date of Patent: Feb. 14, 2023

(54) CELL SELECTION, NETWORK SELECTION, TRACKING AREA MANAGEMENT, AND PAGING FOR AERIAL OPERATION

(71) Applicant: QUALCOMM Incorporated, San Diego, CA (US)

(72) Inventors: Umesh Phuyal, San Diego, CA (US); Alberto Rico Alvarino, San Diego, CA (US); Stefano Faccin, San Ysidro, CA (US); Le Liu, Fremont, CA (US); Lenaig Genevieve Chaponniere, La Jolla, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 17/152,392

(22) Filed: Jan. 19, 2021

(65) Prior Publication Data

US 2022/0232469 A1 Jul. 21, 2022

(51) Int. Cl.
*H04W 48/18* (2009.01)
*H04W 48/20* (2009.01)
(Continued)

(52) U.S. Cl.
CPC ............ *H04W 48/20* (2013.01); *H04W 4/90* (2018.02); *H04W 48/16* (2013.01); *H04W 60/04* (2013.01); *H04W 68/005* (2013.01); *H04W 84/06* (2013.01)

(58) Field of Classification Search
CPC ....... H04W 48/20; H04W 4/90; H04W 48/16; H04W 60/04; H04W 68/005; H04W 84/06; H04W 68/02; H04W 48/18; Y02D 30/70
See application file for complete search history.

(56) References Cited

U.S. PATENT DOCUMENTS

2020/0033849 A1\* 1/2020 Yiu ...................... G05D 1/0022
2020/0092928 A1\* 3/2020 Shi ......................... H04W 76/15
(Continued)

FOREIGN PATENT DOCUMENTS

| WO | WO-2019101837 A1 | 5/2019 |
| WO | WO-2019132746 A1 | 7/2019 |
| WO | WO-2019137949 A1 | 7/2019 |

OTHER PUBLICATIONS

Kyocera, et al., "Considerations for Cell Selection and Reselection with UAVs", 3GPP Draft, 3GPP TSG-RAN WG2 #100, R2-1713507_Aerials_Selection, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 27, 2017-Dec. 1, 2017, Nov. 17, 2017 (Nov. 17, 2017), XP051372206, pp. 1-2, Retrieved from the Internet: URL: http://www.3gpp.org/ftp/tsg%5Fran/WG2%5FRL2/TSGR2%5F100/Docs/ [retrieved on Nov. 17, 2017] p. 1, paragraph 2-p. 2, paragraph 2.
(Continued)

*Primary Examiner* — Said M Elnoubi
(74) *Attorney, Agent, or Firm* — Holland & Hart LLP

(57) ABSTRACT

Methods, systems, and devices for wireless communication are described. In one example, an aerial user equipment (UE) may receive an indication of a priority for cell selection for aerial UEs from each cell in a set of cells and may select a cell from the set of cells based on the priority of each cell in the set of cells. In another example, an aerial UE may connect to a network available to aerial UEs and non-aerial UEs for auxiliary communications, when appropriate. In yet another example, when an aerial UE transitions to a new mission status, the aerial UE may transmit a tracking area update (TAU) if the aerial UE is connected to a cell in a tracking area that does not support the new mission status.
(Continued)

In yet another example, a base station may page an aerial UE based on a mission status of the aerial UE.

27 Claims, 23 Drawing Sheets

(51) Int. Cl.
*H04W 4/90* (2018.01)
*H04W 48/16* (2009.01)
*H04W 60/04* (2009.01)
*H04W 68/00* (2009.01)
*H04W 84/06* (2009.01)

(56) References Cited

U.S. PATENT DOCUMENTS

2020/0288390 A1   9/2020   Wang et al.
2021/0051767 A1*  2/2021   Zhang ................... H04W 88/10

OTHER PUBLICATIONS

Partial International Search Report—PCT/US2021/064091—ISA/EPO—dated Mar. 22, 2022.
International Search Report and Written Opinion—PCT/US2021/064091—ISA/EPO—dated May 13, 2022.

* cited by examiner

CELL SELECTION, NETWORK SELECTION, TRACKING AREA MANAGEMENT, AND PAGING FOR AERIAL OPERATION

FIELD OF TECHNOLOGY

The following relates to wireless communications, including cell selection, network selection, tracking area management, and paging for aerial operation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). In some wireless communications systems, the UEs may include aerial UEs which may be devices capable of flying or maneuvering through the air. In such systems, it may be appropriate for the aerial UEs to communicate with a wireless network to facilitate operation in one or more states (e.g., an aerial state, a ground state, etc.). Efficient techniques at an aerial UE for communicating with a wireless network may be desirable.

SUMMARY

The described techniques relate to improved methods, systems, devices, and apparatuses that support cell selection, network selection, tracking area management, and paging for aerial operation. In one example, an aerial user equipment (UE) may receive an indication of a priority of each cell in a set of cells, where the priority is for cell selection for aerial UEs. The aerial UE may then select a cell from the set of cells based on the priority of each cell in the set of cells. In another example, an aerial UE may connect to both a network dedicated to aerial UEs for communications and a network available to aerial UEs and non-aerial UEs for auxiliary communications. In yet another example, when an aerial UE transitions to a new mission status, the aerial UE may transmit a tracking area update (TAU) if the aerial UE is connected to a cell in a tracking area that does not support the new mission status. In yet another example, a base station may page an aerial UE based on a mission status of the aerial UE.

A method for wireless communication at an aerial user equipment (UE) is described. The method may include receiving first system information indicating a first priority of a first cell for cell selection for aerial UEs, receiving second system information indicating a second priority of a second cell for cell selection for aerial UEs, identifying a mission status of the aerial UE, and selecting the first cell or the second cell for communications based on the first priority of the first cell, the second priority of the second cell, and the mission status of the aerial UE.

An apparatus for wireless communication at an aerial UE is described. The apparatus may include a processor, memory in electronic communication with the processor, and instructions stored in the memory. The instructions may be executable by the processor to cause the apparatus to receive first system information indicating a first priority of a first cell for cell selection for aerial UEs, receive second system information indicating a second priority of a second cell for cell selection for aerial UEs, identify a mission status of the aerial UE, and select the first cell or the second cell for communications based on the first priority of the first cell, the second priority of the second cell, and the mission status of the aerial UE.

Another apparatus for wireless communication at an aerial UE is described. The apparatus may include means for receiving first system information indicating a first priority of a first cell for cell selection for aerial UEs, means for receiving second system information indicating a second priority of a second cell for cell selection for aerial UEs, means for identifying a mission status of the aerial UE, and means for selecting the first cell or the second cell for communications based on the first priority of the first cell, the second priority of the second cell, and the mission status of the aerial UE.

A non-transitory computer-readable medium storing code for wireless communication at an aerial UE is described. The code may include instructions executable by a processor to receive first system information indicating a first priority of a first cell for cell selection for aerial UEs, receive second system information indicating a second priority of a second cell for cell selection for aerial UEs, identify a mission status of the aerial UE, and select the first cell or the second cell for communications based on the first priority of the first cell, the second priority of the second cell, and the mission status of the aerial UE.

In some examples of the method, apparatuses, and non-transitory computer-readable medium described herein, receiving the first system information indicating the first priority of the first cell and the second system information indicating the second priority of the second cell may include operations, features, means, or instructions for receiving the first system information indicating a first set of multiple priorities of the first cell each corresponding to a different mission status of the aerial UE and receiving the second system information indicating a second set of multiple priorities of the second cell each corresponding to a different mission status of the aerial UE.

Some examples of the method, apparatuses, and non-transitory computer-readable medium described herein may further include operations, features, means, or instructions for determining to use the first priority of the first cell from the first set of multiple priorities of the first cell for cell selection based on the mission status of the aerial UE and determining to use the second priority of the second cell of the second set of multiple priorities of the second cell for cell selection based on the mission status of the aerial UE.

In some examples of the method, apparatuses, and non-transitory computer-readable medium described herein, the mission status of the aerial UE includes an aerial state, a ground state, a pre-flight state, or a post-flight state. In some examples of the method, apparatuses, and non-transitory computer-readable medium described herein, the first priority of the first cell corresponds to a first level of support for aerial UEs at the first cell, and the second priority of the second cell corresponds to a second level of support for aerial UEs at the second cell. In some examples of the method, apparatuses, and non-transitory computer-readable medium described herein, the first cell or the second cell may be dedicated to aerial UEs or available to aerial UEs and non-aerial UEs.

A method for wireless communication at a base station is described. The method may include transmitting system information indicating a priority of a cell for cell selection for aerial UEs and connecting to an aerial UE for communications via the cell based on transmitting the system information indicating the priority of the cell.

An apparatus for wireless communication at a base station is described. The apparatus may include a processor, memory in electronic communication with the processor, and instructions stored in the memory. The instructions may be executable by the processor to cause the apparatus to transmit system information indicating a priority of a cell for cell selection for aerial UEs and connect to an aerial UE for communications via the cell based on transmitting the system information indicating the priority of the cell.

Another apparatus for wireless communication at a base station is described. The apparatus may include means for transmitting system information indicating a priority of a cell for cell selection for aerial UEs and means for connecting to an aerial UE for communications via the cell based on transmitting the system information indicating the priority of the cell.

A non-transitory computer-readable medium storing code for wireless communication at a base station is described. The code may include instructions executable by a processor to transmit system information indicating a priority of a cell for cell selection for aerial UEs and connect to an aerial UE for communications via the cell based on transmitting the system information indicating the priority of the cell.

In some examples of the method, apparatuses, and non-transitory computer-readable medium described herein, transmitting the system information indicating the priority of the cell may include operations, features, means, or instructions for transmitting the system information indicating a set of multiple priorities of the cell each corresponding to a different mission status of the aerial UE. In some examples of the method, apparatuses, and non-transitory computer-readable medium described herein, the different mission status of the aerial UE includes an aerial state, a ground state, a pre-flight state, or a post-flight state.

In some examples of the method, apparatuses, and non-transitory computer-readable medium described herein, the priority of the cell for cell selection for aerial UEs includes a first priority and the method, apparatuses, and non-transitory computer-readable medium may include further operations, features, means, or instructions for transmitting, in the system information, an indication of a second priority of the cell for cell selection for non-aerial UEs. In some examples of the method, apparatuses, and non-transitory computer-readable medium described herein, the priority of the cell corresponds to a level of support for aerial UEs at the cell. In some examples of the method, apparatuses, and non-transitory computer-readable medium described herein, the cell may be dedicated to aerial UEs or available to aerial UEs and non-aerial UEs.

A method for wireless communication at an aerial UE is described. The method may include receiving, in first system information from a first cell, an indication of a first network dedicated to aerial UEs, receiving, in the first system information from the first cell or in second system information from a second cell, an indication of a second network available to aerial UEs and non-aerial UEs, and connecting to the first network for communications via the first cell and to the second network for auxiliary communications via the first cell or the second cell.

An apparatus for wireless communication at an aerial UE is described. The apparatus may include a processor, memory in electronic communication with the processor, and instructions stored in the memory. The instructions may be executable by the processor to cause the apparatus to receive, in first system information from a first cell, an indication of a first network dedicated to aerial UEs, receive, in the first system information from the first cell or in second system information from a second cell, an indication of a second network available to aerial UEs and non-aerial UEs, and connect to the first network for communications via the first cell and to the second network for auxiliary communications via the first cell or the second cell.

Another apparatus for wireless communication at an aerial UE is described. The apparatus may include means for receiving, in first system information from a first cell, an indication of a first network dedicated to aerial UEs, means for receiving, in the first system information from the first cell or in second system information from a second cell, an indication of a second network available to aerial UEs and non-aerial UEs, and means for connecting to the first network for communications via the first cell and to the second network for auxiliary communications via the first cell or the second cell.

A non-transitory computer-readable medium storing code for wireless communication at an aerial UE is described. The code may include instructions executable by a processor to receive, in first system information from a first cell, an indication of a first network dedicated to aerial UEs, receive, in the first system information from the first cell or in second system information from a second cell, an indication of a second network available to aerial UEs and non-aerial UEs, and connect to the first network for communications via the first cell and to the second network for auxiliary communications via the first cell or the second cell.

Some examples of the method, apparatuses, and non-transitory computer-readable medium described herein may further include operations, features, means, or instructions for determining that an amount of data for transmission to the first network via the first cell exceeds a threshold and transmitting a first portion of the data to the first network via the first cell and a second portion of the data to the second network via the first cell or the second cell based on the determining. In some examples of the method, apparatuses, and non-transitory computer-readable medium described herein, the first portion of the data includes flight-operation data, and the second portion of the data includes payload data.

Some examples of the method, apparatuses, and non-transitory computer-readable medium described herein may further include operations, features, means, or instructions for determining that an amount of data for transmission to the first network via the first cell may be below a threshold and transmitting the data to the first network via the first cell based on the determining. In some examples of the method, apparatuses, and non-transitory computer-readable medium described herein, the data includes flight-operation data and payload data.

Some examples of the method, apparatuses, and non-transitory computer-readable medium described herein may further include operations, features, means, or instructions for transmitting flight-operation data to the first network via the first cell and payload data to the second network via the second cell. Some examples of the method, apparatuses, and non-transitory computer-readable medium described herein may further include operations, features, means, or instructions for connecting to the first network and to the second network may be based on the aerial UE being in an aerial state.

In some examples of the method, apparatuses, and non-transitory computer-readable medium described herein, the first network dedicated to aerial UEs supports emergency calls by aerial UEs, non-aerial UEs, or both. In some examples of the method, apparatuses, and non-transitory computer-readable medium described herein, the first system information includes a first network identity list indicating the first network, and the second system information includes a second network identity list indicating the second network. In some examples of the method, apparatuses, and non-transitory computer-readable medium described herein, the first system information includes a network identity list indicating the first network and the second network.

In some examples of the method, apparatuses, and non-transitory computer-readable medium described herein, the aerial UE includes a first subscriber identity module and a second subscriber identity module and the method, apparatuses, and non-transitory computer-readable medium may include further operations, features, means, or instructions for communicating with the first network via the first cell using the first subscriber identity module at the aerial UE and communicating with the second network via the first cell or the second cell using the second subscriber identity module at the aerial UE.

In some examples of the method, apparatuses, and non-transitory computer-readable medium described herein, the aerial UE includes a single subscriber identity module and the method, apparatuses, and non-transitory computer-readable medium may include further operations, features, means, or instructions for communicating, over a split bearer, with the first network via the first cell and the second network via the second cell using the single subscriber identity module at the aerial UE.

A method for wireless communication at an aerial UE is described. The method may include communicating with a cell in a tracking area while in a first mission status, determining to transition to a second mission status, and determining whether to transmit a tracking area update based on whether the tracking area supports the second mission status.

An apparatus for wireless communication at an aerial UE is described. The apparatus may include a processor, memory in electronic communication with the processor, and instructions stored in the memory. The instructions may be executable by the processor to cause the apparatus to communicate with a cell in a tracking area while in a first mission status, determine to transition to a second mission status, and determine whether to transmit a tracking area update based on whether the tracking area supports the second mission status.

Another apparatus for wireless communication at an aerial UE is described. The apparatus may include means for communicating with a cell in a tracking area while in a first mission status, means for determining to transition to a second mission status, and means for determining whether to transmit a tracking area update based on whether the tracking area supports the second mission status.

A non-transitory computer-readable medium storing code for wireless communication at an aerial UE is described. The code may include instructions executable by a processor to communicate with a cell in a tracking area while in a first mission status, determine to transition to a second mission status, and determine whether to transmit a tracking area update based on whether the tracking area supports the second mission status.

In some examples of the method, apparatuses, and non-transitory computer-readable medium described herein, the cell includes a first cell and the method, apparatuses, and non-transitory computer-readable medium may include further operations, features, means, or instructions for connecting to a second cell in a second tracking area if the first tracking area fails to support the second mission status and transmitting a tracking area update based on connecting to the second cell in the second tracking area.

In some examples of the method, apparatuses, and non-transitory computer-readable medium described herein, the first tracking area includes cells available to aerial UEs and non-aerial UEs and the second tracking area includes cells dedicated to aerial UEs. Some examples of the method, apparatuses, and non-transitory computer-readable medium described herein may further include operations, features, means, or instructions for suppressing transmission of a tracking area update if the tracking area supports the second mission status. In some examples of the method, apparatuses, and non-transitory computer-readable medium described herein, the tracking area includes cells dedicated to aerial UEs. In some examples of the method, apparatuses, and non-transitory computer-readable medium described herein, the tracking area includes a first tracking area and the method, apparatuses, and non-transitory computer-readable medium may include further operations, features, means, or instructions for suppressing transmission of a tracking area update if the cell supports the second mission status.

A method for wireless communication at a base station is described. The method may include identifying that an aerial UE is connected to a cell within a tracking area, the tracking area including a first set of cells dedicated to aerial UEs and a second set of cells available to aerial UEs and non-aerial UEs, determining a mission status of the aerial UE, and paging the aerial UE via one or more cells in the tracking area based on the mission status of the aerial UE.

An apparatus for wireless communication at a base station is described. The apparatus may include a processor, memory in electronic communication with the processor, and instructions stored in the memory. The instructions may be executable by the processor to cause the apparatus to identify that an aerial UE is connected to a cell within a tracking area, the tracking area including a first set of cells dedicated to aerial UEs and a second set of cells available to aerial UEs and non-aerial UEs, determine a mission status of the aerial UE, and page the aerial UE via one or more cells in the tracking area based on the mission status of the aerial UE.

Another apparatus for wireless communication at a base station is described. The apparatus may include means for identifying that an aerial UE is connected to a cell within a tracking area, the tracking area including a first set of cells dedicated to aerial UEs and a second set of cells available to aerial UEs and non-aerial UEs, means for determining a mission status of the aerial UE, and means for paging the aerial UE via one or more cells in the tracking area based on the mission status of the aerial UE.

A non-transitory computer-readable medium storing code for wireless communication at a base station is described. The code may include instructions executable by a processor to identify that an aerial UE is connected to a cell within a tracking area, the tracking area including a first set of cells dedicated to aerial UEs and a second set of cells available to aerial UEs and non-aerial UEs, determine a mission status of the aerial UE, and page the aerial UE via one or more cells in the tracking area based on the mission status of the aerial UE.

Some examples of the method, apparatuses, and non-transitory computer-readable medium described herein may further include operations, features, means, or instructions for paging the aerial UE via the first set of cells dedicated to aerial UEs in the tracking area if the aerial UE may be in an aerial state. Some examples of the method, apparatuses, and non-transitory computer-readable medium described herein may further include operations, features, means, or instructions for paging the aerial UE via the first set of cells and the second set of cells in the tracking area if the base station failed to receive a response to the paging via the first set of cells dedicated to aerial UEs. Some examples of the method, apparatuses, and non-transitory computer-readable medium described herein may further include operations, features, means, or instructions for paging the aerial UE via the second set of cells in the tracking area if the base station failed to receive a response to the paging via the first set of cells dedicated to aerial UEs.

DETAILED DESCRIPTION

Some wireless communications systems may support aerial user equipment (UEs) which may be devices capable of flying or maneuvering through the air. One example of an aerial UE is an unmanned aerial vehicle (UAV), which may also be referred to as a drone. In some cases, it may be appropriate for aerial UEs to support similar operations to non-aerial UEs when connected to a wireless network. For instance, it may be appropriate to enable 3GPP technologies (e.g., New Radio (NR)) for aerial UEs operating in a spectrum dedicated to the aerial UEs. In such cases, there may be a number of challenges to solve to facilitate smooth operation of aerial UEs in the wireless network. Such challenges may include cell selection, public land mobile network (PLMN) selection, tracking area management, and paging management for aerial UEs. Further, because the communication requirements of an aerial UE may change depending on a mission status in which the aerial UE is operating (e.g., an aerial state, a ground state, a pre-flight state, or a post-flight state), it may not be feasible to adopt operations used by non-aerial UEs for aerial UEs.

As described herein, a wireless communications system may support efficient techniques for cell selection, network selection, tracking area management, and paging for aerial operation. In one example, an aerial UE may receive an indication of a priority of each cell in a set of cells, where the priority is for cell selection for aerial UEs. The aerial UE may then select a cell from the set of cells based on the priority of each cell in the set of cells. In another example, an aerial UE may connect to both a network dedicated to aerial UEs for communications and a network available to aerial UEs and non-aerial UEs for auxiliary communications. In yet another example, when an aerial UE transitions to a new mission status, the aerial UE may transmit a tracking area update (TAU) if the aerial UE is connected to a cell in a tracking area that does not support the new mission status. In yet another example, a base station may page an aerial UE based on a mission status of the aerial UE.

Aspects of the disclosure introduced above are described below in the context of a wireless communications system. Examples of processes and signaling exchanges that support cell selection, network selection, tracking area management, and paging for aerial operation are then described. Aspects of the disclosure are further illustrated by and described with reference to apparatus diagrams, system diagrams, and flowcharts that relate to cell selection, network selection, tracking area management, and paging for aerial operation.

Figure 1:
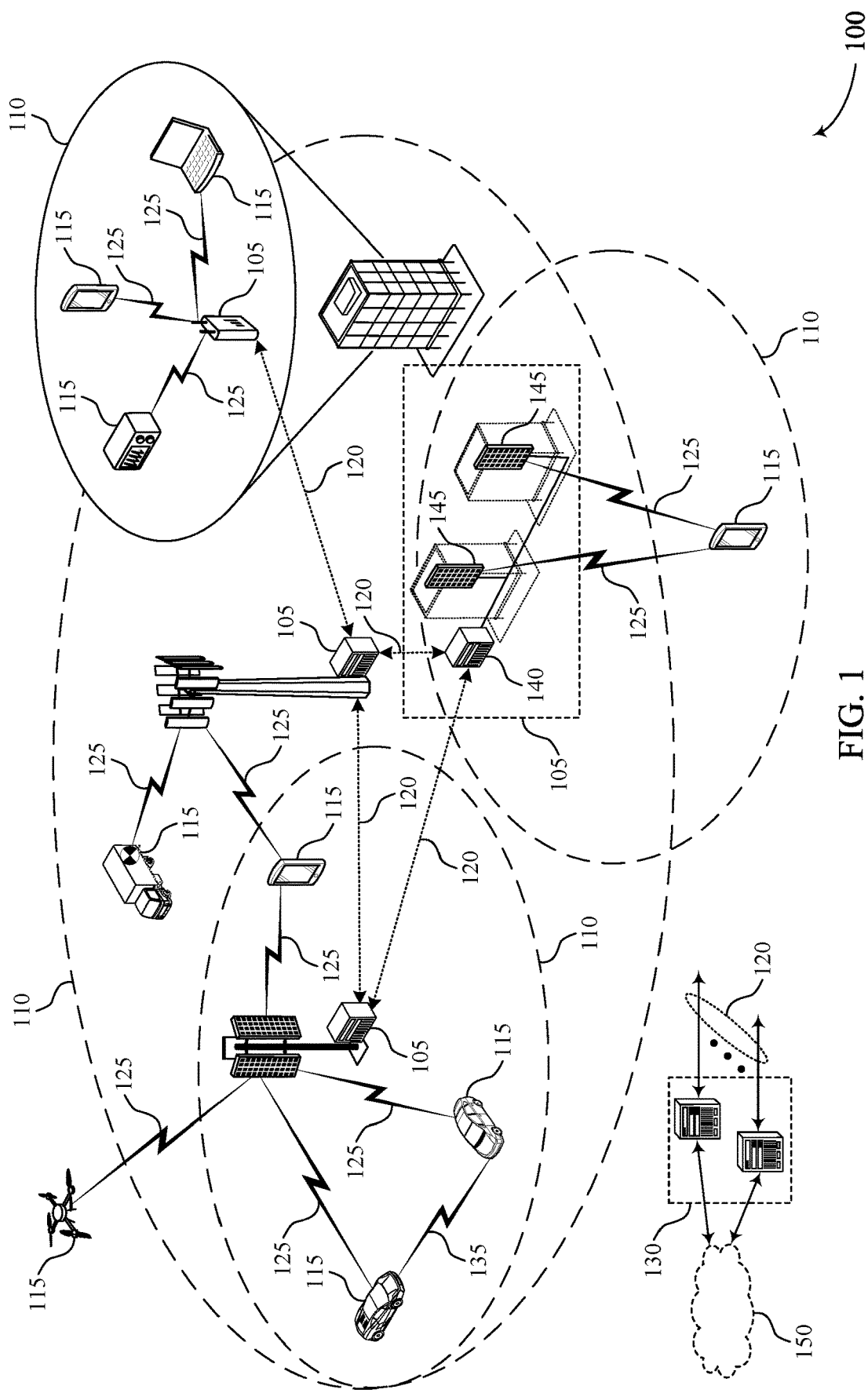
FIG. 1 illustrates an example of a wireless communications system that supports cell selection, network selection, tracking area management, and paging for aerial operation in accordance with aspects of the present disclosure.

FIG. 1 illustrates an example of a wireless communications system 100 that supports cell selection, network selection, tracking area management, and paging for aerial operation in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, an aerial device, a UAV, a drone, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some UEs 115 in wireless communications system 100 may be aerial UEs capable of flying or maneuvering through the air. Such aerial UEs may support uplink or downlink communications with one or more cells or sidelink communications with each other. To facilitate the uplink, downlink, and sidelink communications by aerial UEs, wireless communications system 100 may define a spectrum dedicated to aerial UEs. The dedicated spectrum may be for uplink and downlink communications between aerial UEs and one or more cells (e.g., over a Uu interface), or the dedicated spectrum may be for sidelink communications between aerial UEs (e.g., over a PC5 interface). In addition to the dedicated spectrum, aerial UEs may operate in other wireless spectrums. The wireless communications system may support efficient techniques for operation of aerial UEs in dedicated spectrum and other spectrums. An aerial UE may be, for example, a UAV or drone, or a UE installed in a UAV or drone.

Figure 2:
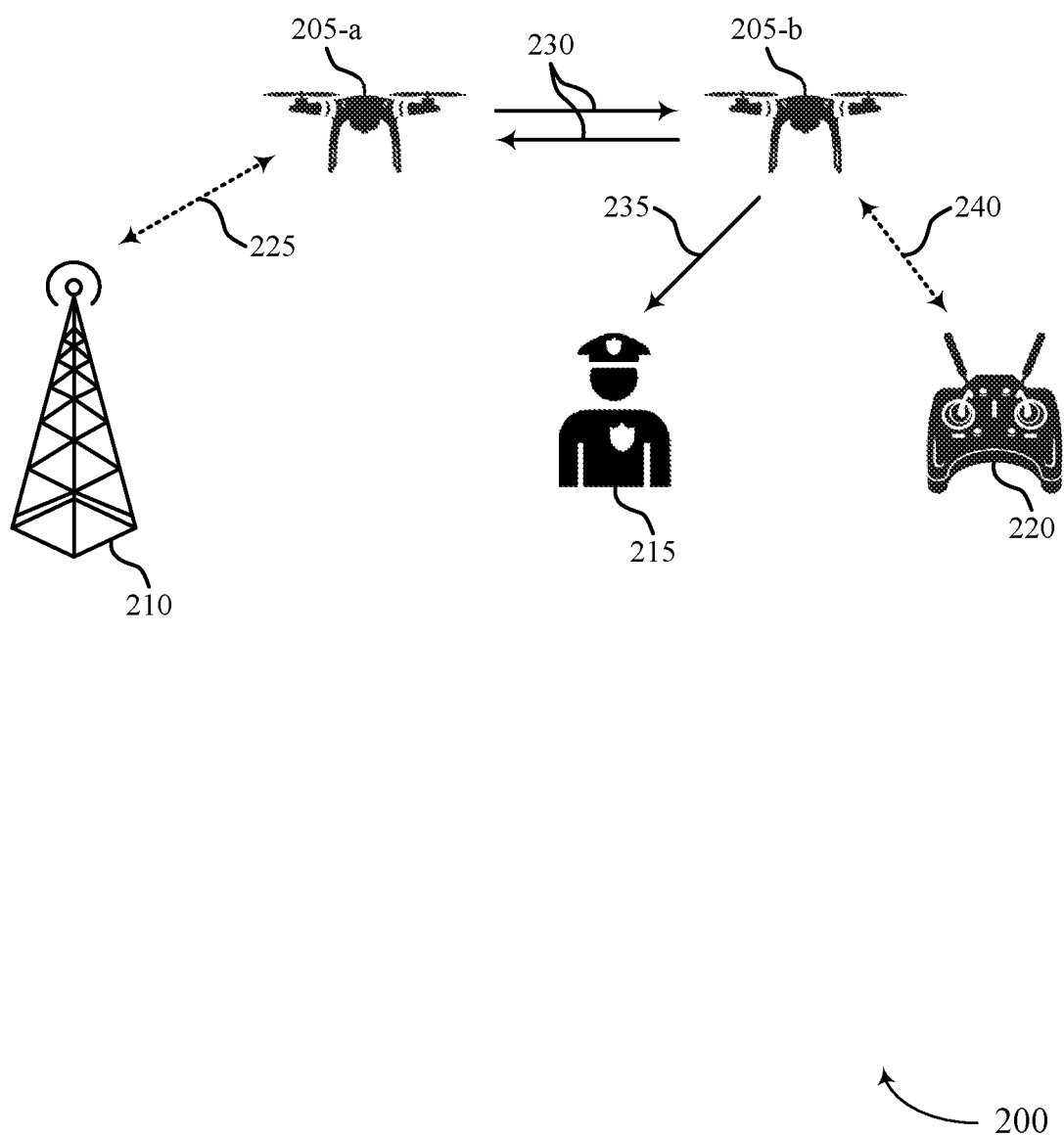
FIG. 2 illustrates an example of radio aspects of aerial user equipment (UE) communications in accordance with aspects of the present disclosure.

FIG. 2 illustrates an example of radio aspects 200 of aerial UE communications in accordance with aspects of the present disclosure. In the example of FIG. 2, an aerial UE 205-a may establish a connection 225 (e.g., Uu connectivity) with a cell 210, and the aerial UE 205-a may communicate with the cell 210 to support different applications (e.g., video, remote command and control (C2), etc.). The aerial UE 205-a may also establish a connection 230 (e.g., PC5) connection with another aerial UE 205-b, and the aerial UE 205-a may communicate with the aerial UE 205-b to support other applications. Examples of such other applications include user-to-everything (U2X) detect and avoid (U2X-DAA) applications and other applications mainly used for collision control (e.g., using broadcast messages).

In some examples, the aerial UE 205-b may also interact (e.g., over a connection 235, such as a PC5 connection) with a law enforcement officer 215 or service for identification and other purposes. As an example, the aerial UE 205-b may interact with the law enforcement officer 215 or service for U2X identification (ID) (e.g., remote identification), and the aerial UE 205-b may identify or receive flight information from the law enforcement officer 215 or service (e.g., using broadcast messages). In other examples, the aerial UE 205-b may establish a connection 240 with a remote control 220 for remote command and control (C2). In some cases, the connection 240 may be within visual line of sight while in other cases the connection 240 may be beyond visual line of sight (e.g., up to 10 km or beyond). The connection 240 may be referred to as a U2X-C2 connection and may be, for example, a PC5, bidirectional connection.

In some cases, it may be appropriate for aerial UEs to support similar operations to non-aerial UEs when connected to a wireless network. For instance, it may be appropriate to enable 3GPP technologies (e.g., New Radio (NR)) for aerial UEs operating in a spectrum dedicated to the aerial UEs (e.g., UAV dedicated spectrum). In such cases, there may be a number of challenges to solve to facilitate smooth operation of aerial UEs in the wireless network. Such challenges may include cell selection, PLMN selection, tracking area management, and paging management for aerial UEs. Further, because the communication requirements of an aerial UE may change depending on a mission status in which the aerial UE is operating (e.g., an aerial state, a ground state, a pre-flight state, or a post-flight state), it may not be feasible to adopt operations used by non-aerial UEs for aerial UEs.

Wireless communications system 100 may support efficient techniques for cell selection, network selection, tracking area management, and paging for aerial operation. In one example, an aerial UE may receive an indication of a priority of each cell in a set of cells, where the priority is for cell selection for aerial UEs. The aerial UE may then select a cell from the set of cells based on the priority of each cell in the set of cells. In another example, an aerial UE may connect to both a network dedicated to aerial UEs for communications and a network available to aerial UEs and non-aerial UEs for auxiliary communications. In yet another example, when an aerial UE transitions to a new mission status, the aerial UE may transmit a TAU if the aerial UE is connected to a cell in a tracking area that does not support the new mission status. In yet another example, a base station may page an aerial UE based on a mission status of the aerial UE.

As described above, aerial UEs may be UEs 115 capable of flying or maneuvering through the air. An aerial UE, while capable of being in flight, need not be airborne in order to access the resources or cells reserved for aerial UEs. For instance, it may be equally important for a drone (e.g., aerial UE) on the ground to be able to access the resources or cells reserved for aerial UEs. Further, the type for a UE may be either aerial or non-aerial, and the type may be fixed. That is, non-aerial UEs may be UEs 115 that are not configured as aerial UEs (e.g., not capable of aerial operation).

In the examples described herein, communications with aerial UEs may be referred to as aerial communications, and aerial communications may include uplink or downlink communications between aerial UEs and one or more cells, or sidelink communications between aerial UEs. In addition, cells exclusively supporting aerial communications (e.g., dedicated to aerial UEs) may be referred to as aerial cells, and cells supporting aerial communications and communications with non-aerial UEs (e.g., cells available to aerial UEs and non-aerial UEs) may be referred to as hybrid cells. Further, a spectrum, frequency band, carrier, or resource dedicated to aerial UEs may be allocated exclusively for aerial communications and may be referred to as an aerial, aerial-only or aerial-UE-only spectrum, frequency band, carrier, or resource. Similarly, a spectrum, frequency band, carrier, or resource available to aerial UEs and non-aerial UEs may be referred to as a non-aerial spectrum, frequency band, carrier, or resource. An aerial UE may prioritize communications with aerial cells but may communicate with hybrid cells when aerial cells are unavailable. Hybrid cells may operate in both dedicated aerial bands and non-aerial bands.

Figure 3:
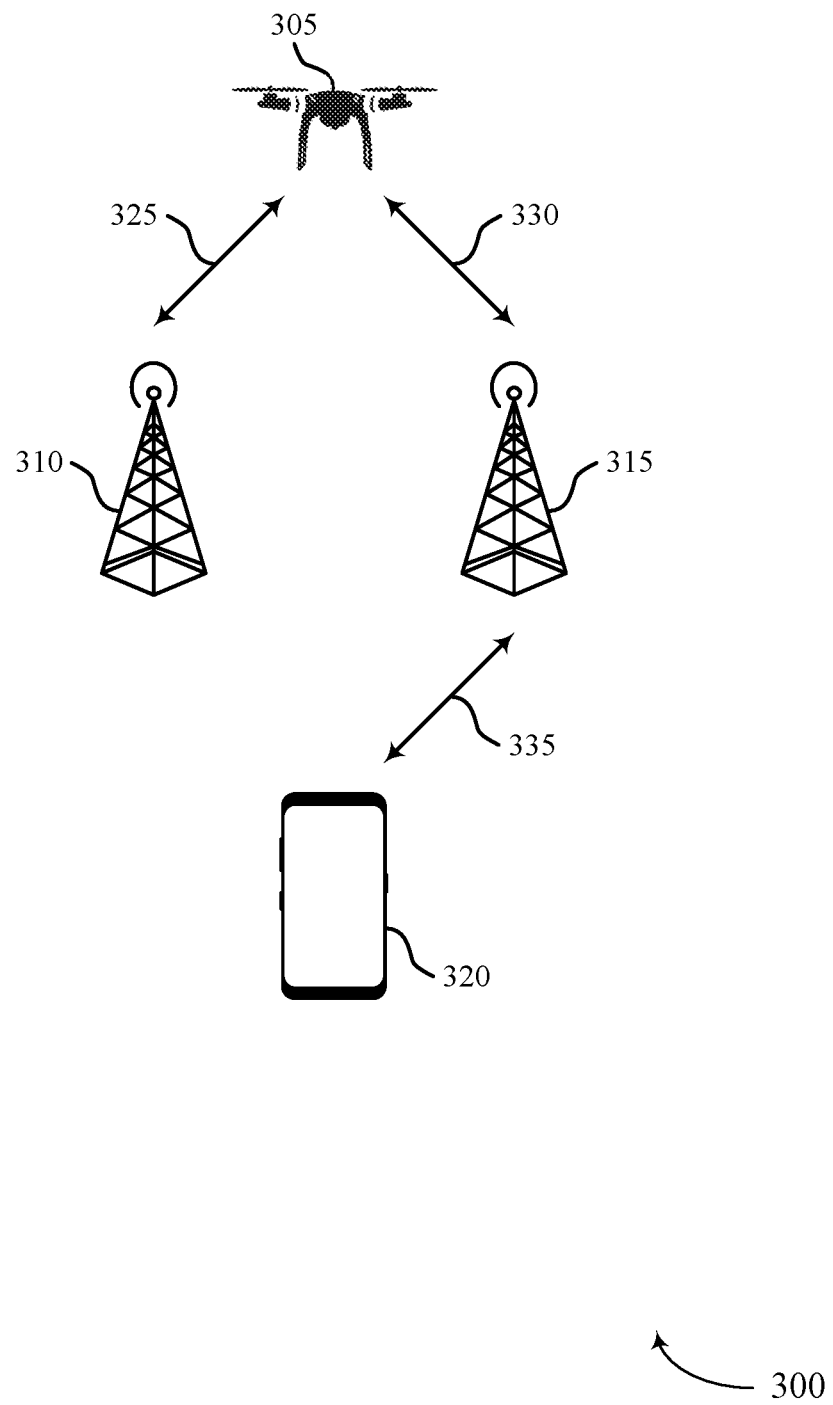
FIG. 3 illustrates an example of a wireless communications system that supports cell selection, network selection, tracking area management, and paging for aerial operation in accordance with aspects of the present disclosure.

FIG. 3 illustrates an example of a wireless communications system 300 that supports cell selection, network selection, tracking area management, and paging for aerial operation in accordance with aspects of the present disclosure. Wireless communications system 300 includes an aerial UE 305, a cell 310 dedicated to aerial UEs (e.g., an aerial cell), a cell 315 available to aerial UEs and non-aerial UEs (e.g., a hybrid cell), and a non-aerial UE 320. The wireless communications system 300 may indicate that the cell 310 is for aerial UE use only to prevent non-aerial UEs from camping on the cell 310. Thus, the aerial UE 305 may be able to establish a connection 325 with the cell 310, but the non-aerial UE 320 may be unable to establish a connection with the cell 310. Alternatively, because the cell 315 may be available to aerial UEs and non-aerial UEs, the aerial UE 305 may be able to establish a connection 330 with the cell 315, and the non-aerial UE 320 may be able to establish a connection 335 with the cell 315.

In the example of FIG. 3, a service-specific cell selection or reselection priority of a cell may be defined for aerial UEs, including the aerial UE 305. The service-specific cell selection or reselection priority may refer to a priority of a cell used exclusively by aerial UEs for cell selection or reselection (e.g., aerial-UE-specific priority) and may differ from another priority of the cell used by any UE for cell selection or reselection.

A cell may broadcast a priority for cell selection or reselection by aerial UEs, and an aerial UE may prioritize the cell for selection or reselection based on the broadcasted priority. For instance, the cell 310 may transmit, and the aerial UE 305 may receive, system information over the connection 325 indicating a first priority for cell selection for the aerial UE 305, and the cell 315 may transmit, and the aerial UE 305 may receive, system information over the connection 330 indicating a second priority for cell selection for the aerial UE 305. Because the cell 310 may be dedicated to aerial UEs, the first priority broadcast by the cell 310 may be higher than the second priority broadcast by the cell 315.

On the network side, the cell priority configuration (e.g., the priority of a cell for cell selection for aerial UEs) may be based on a level of support that can be provided for aerial UEs. For example, the cell priority configuration of a cell may be based on the availability of aerial-UE-specific enhancements in the cell, such as power control, interference mitigation features, or the bands being used by the cell. Thus, if another cell has a higher level of support for aerial UEs than the cell 310, the priority broadcast by the other cell may be higher than the first priority broadcast by the cell 310.

On the aerial UE side, the cell selection prioritization (e.g., the prioritization of cells for cell selection) may also depend on a mission status or state of the aerial UE 305. The aerial UE 305 may operate in one of a number of states, including an aerial state (e.g., flying), a ground state, a pre-flight state, a post-flight state, etc. When the aerial UE 305 is in a ground state or a pre-flight state, the aerial UE 305 may use any band (e.g., and a corresponding cell supporting the band) for connectivity (e.g., UAV unmanned aircraft system (UAS) service supplier (USS) connectivity) since traffic to or from the aerial UE 305 may not be for C2. Once the mission status of the aerial UE 305 changes (e.g., to an aerial state), and the aerial UE 305 is expected to receive C2 signals via cellular communications, the aerial UE 305 may prioritize bands dedicated to aerial UEs for aerial communications (e.g., and the corresponding cells supporting these bands).

Figure 4:
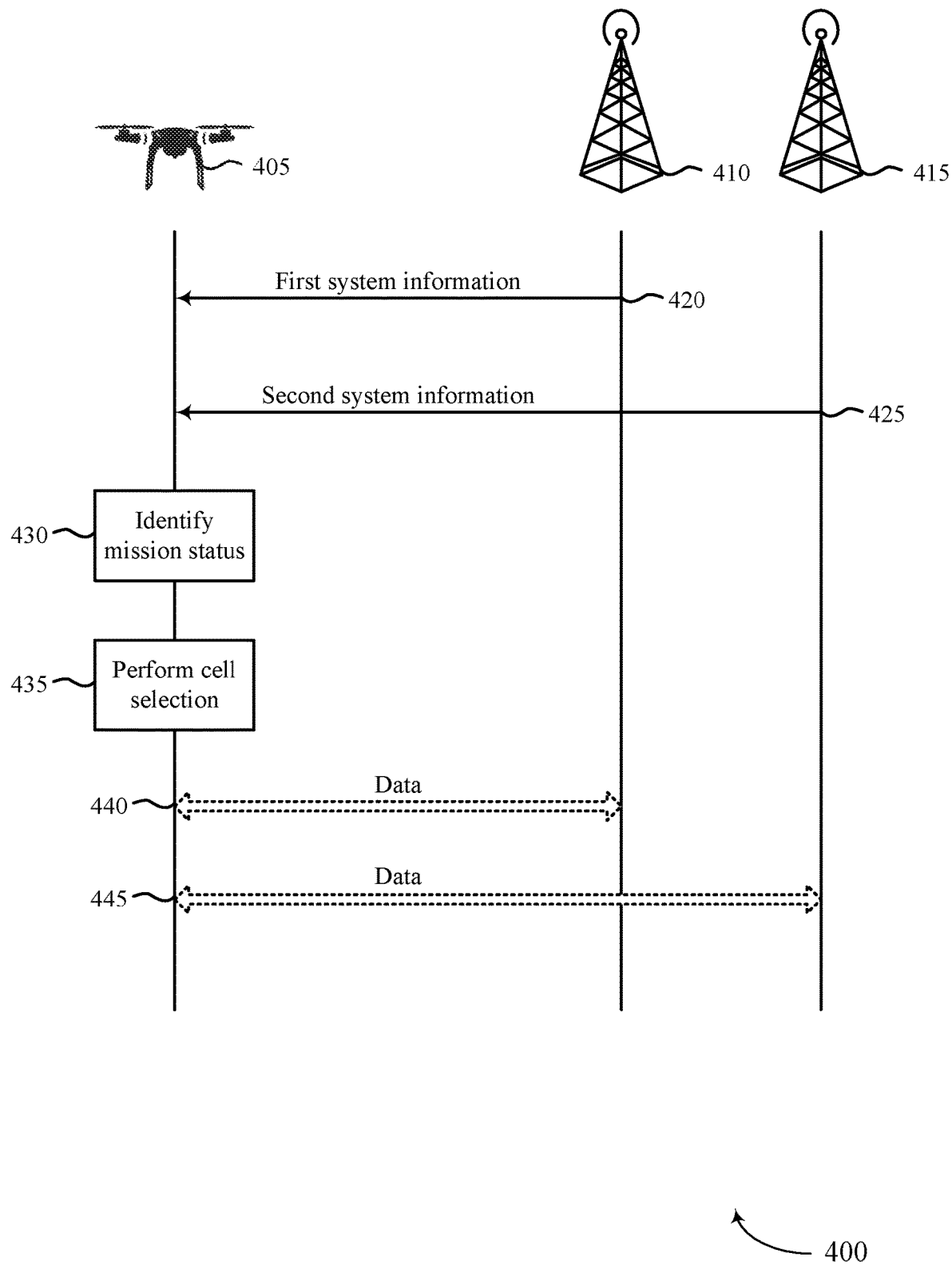
FIG. 4 illustrates an example of a process flow that supports cell selection, network selection, tracking area management, and paging for aerial operation in accordance with aspects of the present disclosure.

FIG. 4 illustrates an example of a process flow 400 that supports cell selection, network selection, tracking area management, and paging for aerial operation in accordance with aspects of the present disclosure. Process flow 400 includes an aerial UE 405, a first cell 410, and a second cell 415, which may be examples of corresponding device described with reference to FIGS. 1-3. In the following description of the process flow 400, the signaling exchanged between the aerial UE 405, the first cell 410, and the second cell 415 may be exchanged in a different order than the example order shown, or the operations performed by the aerial UE 405, the first cell 410, and the second cell 415 may be performed in different orders or at different times. Some operations may also be omitted from the process flow 400, and other operations may be added to the process flow 400.

At 420, the first cell 410 may transmit, and the aerial UE 405 may receive, first system information indicating a first priority of the first cell 410 for cell selection for aerial UEs. At 425, the second cell 415 may transmit, and the aerial UE 405 may receive, second system information indicating a second priority of the second cell 415 for cell selection for aerial UEs. At 430, the aerial UE 405 may identify a mission status of the aerial UE 405 (e.g., a state in which the aerial UE 405 is operating, such as an aerial state, ground state, pre-flight state, post-flight state, etc.). At 435, the aerial UE 405 may select the first cell or the second cell for communications based on the first priority of the first cell, the second priority of the second cell, or the mission status of the aerial UE 405. For example, the aerial UE 405 may apply the priorities of the first cell 410 and second cell 415 for cell selection for aerial UEs regardless of the mission status. Alternatively, the aerial UE 405 may apply the priorities of the first cell 410 and second cell 415 for cell selection for aerial UEs when the aerial UE 405 is in an aerial state. Additionally, or alternatively, the aerial UE 405 may perform the cell selection dependent on a type of traffic. For example, if the type of traffic is not for C2 communications, the aerial UE 405 may perform the cell selection without applying the priorities of the first cell 410 and second cell 415 for aerial UEs (e.g., applying a default or non-aerial priority for each cell). If the type of traffic is for C2, the aerial UE 405 may apply the priorities of the first cell 410 and second cell 415 for cell selection for aerial UEs. If, at 435, the aerial UE 405 selected the first cell 410, then, at 440, the aerial UE 405 may communicate (e.g., exchange data) with the first cell 410. Additionally, or alternatively, if, at 435, the aerial UE 405 selected the second cell 415, then, at 445, the aerial UE 405 may communicate (e.g., exchange data) with the second cell 415.

In some cases, the first system information may indicate multiple priorities of the first cell 410 each corresponding to a different mission status of the aerial UE 405. In such cases, the aerial UE 405 may determine to use the first priority of the first cell 410 from the multiple priorities based on a mission status of the aerial UE 405. Additionally, or alternatively, the aerial UE 405 may select a cell based on a priority of the cell for cell selection for aerial UEs (e.g., the aerial-UE-specific priority) if the aerial UE 405 is in a particular state (e.g., an aerial state). Similarly, in some cases, the second system information may indicate multiple priorities of the second cell 415 each corresponding to a different mission status of the aerial UE 405. In such cases, the aerial UE 405 may determine to use the second priority of the second cell 415 from the multiple priorities based on a mission status of the aerial UE 405. Additionally, or alternatively, the aerial UE 405 may select a cell based on a priority of the cell for cell selection for aerial UEs (e.g., the aerial-UE-specific priority) if the aerial UE 405 is in a particular state (e.g., an aerial state).

As described with reference to FIG. 3, the first priority of the first cell 410 may correspond to a first level of support for aerial UEs at the first cell 410, and the second priority of the second cell 415 may correspond to a second level of support for aerial UEs at the second cell 415. The first cell 410 or the second cell 415 may be dedicated to aerial UEs or available to aerial UEs and non-aerial UEs. Further, the first priority of the first cell 410 may be different from a second priority of the first cell 410 used for cell selection by any UE 115 (e.g., not only aerial UEs). The first cell 410 may transmit, in the first system information, an indication of the second priority of the first cell 410 for cell selection for all UEs 115 (e.g., including non-aerial UEs).

Figure 5:
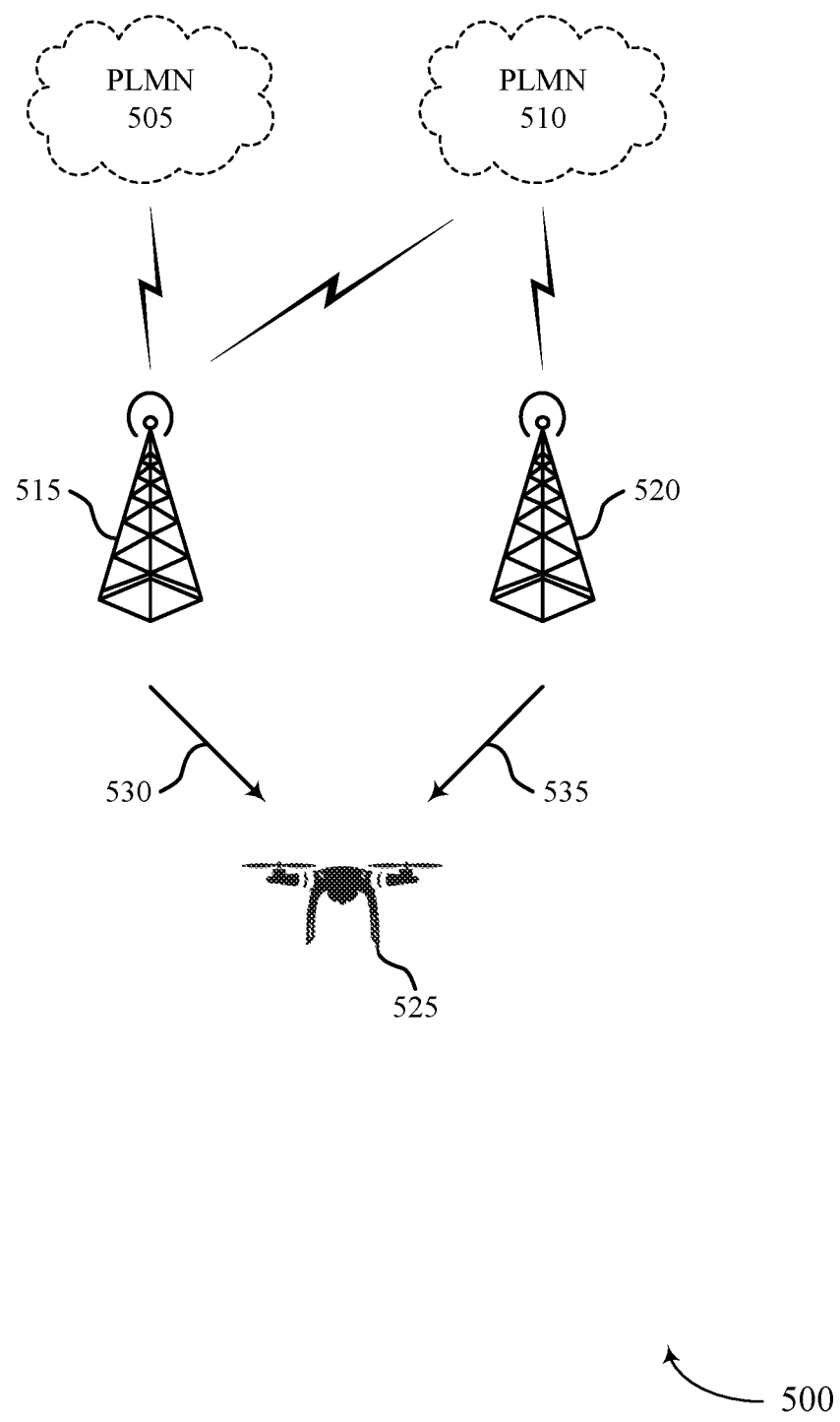
FIG. 5 illustrates an example of a wireless communications system that supports cell selection, network selection, tracking area management, and paging for aerial operation in accordance with aspects of the present disclosure.

FIG. 5 illustrates an example of a wireless communications system 500 that supports cell selection, network selection, tracking area management, and paging for aerial operation in accordance with aspects of the present disclosure. Wireless communications system 500 includes a first PLMN 505, a second PLMN 510, a first cell 515, a second cell 520, and an aerial UE 525. The first PLMN 505 may be dedicated to aerial UEs and may be referred to as an aerial-only PLMN, and the second PLMN 510 may be available for aerial UEs and non-aerial UEs. A cell may be a part of the first PLMN, a part of the second PLMN, or both. In some examples, aerial-only PLMNs may be associated with UAV dedicated frequency bands. Aerial UEs may be restricted to UAV dedicated frequency bands in some areas, and thus may be restricted to using certain PLMNs in certain areas. In some examples, the aerial UE 525 may prioritize the first PLMN 550 when available, and the aerial UE 525 may take the capability of a network into account when performing network selection (e.g., if the PLMN supports aerial communications, especially for roaming cases).

In FIG. 5, the first cell 515 may be associated with only the first PLMN 505, and the second cell 520 may be associated with the second PLMN 510. In such cases, the aerial UE 525 may establish a connection 530 with the first cell 515 or the second cell 520, or both. In other cases, the first cell 515 may be associated with the first PLMN 505 and the second PLMN 510. In such cases, the aerial UE 525 may establish the connection 530 with the first cell 515 for communications including both flight operations (e.g., C2 communications) and payload communications (e.g., video, non-flight operations data).

In certain areas, the aerial UE 525 may be allowed to select any bands available for communication, such as bands used for communicating with the second PLMN 510. In other areas, the aerial UE 525 may be restricted to specific bands, such as bands used for communicating with the first PLMN 505 (e.g., dedicated aerial bands). The aerial UE 525 may know the airspace type in which the aerial UE 525 is operating (e.g., based on a preconfiguration indicating that a certain location corresponds to a specific airspace type or based on receiving an indication of the airspace type from a USS when a flight plan is approved). Some PLMNs may be specific to aerial services (e.g., aerial-only PLMNs), and other PLMNs may support other services. For instance, the first PLMN 505 may be dedicated to aerial UEs and the second PLMN 510 may be available for aerial UEs and non-aerial UEs.

PLMN selection by the aerial UE 525 may depend on a state of the aerial UE 525 (e.g., flying vs non-flying or on a mission vs on the ground). As an example, when the aerial UE 525 is on the ground performing a software update, the software update may be done via a network operating on a non-aerial band (e.g., a band available to aerial UEs and non-aerial UEs). A dedicated aerial band (e.g., a band dedicated to aerial UEs) may be prioritized only for aerial flight operation. Thus, PLMN selection by the aerial UE 525 may depend on a service required or desired by the aerial UE 525. In some cases, regulators may indicate that aerial UEs may use bands dedicated to aerial UEs (e.g., aerial bands) for flight operations (e.g., C2 communications) and may restrict commercial payload (e.g., video transmission from a surveillance camera on a drone) to be over bands or PLMNs available to aerial UEs and non-aerial UEs (e.g., non-aerial bands).

If the first cell 515 is associated with only the first PLMN 505, and the second cell is associated with the second PLMN 510, the first cell 515 may transmit, and the aerial UE 525 may receive, system information over the connection 530 identifying the first PLMN 505, and the second cell 520 may transmit, and the aerial UE 525 may receive, system information over the connection 535 identifying the second PLMN 510. If the first cell 515 is associated with the first PLMN 505 and the second PLMN 510, the first cell 515 may transmit, and the aerial UE 525 may receive, system information over the connection 530 identifying the first PLMN 505 and the second PLMN 510. Each system information transmission may correspond to a system information block (SIB) and may include a PLMN-identity list identifying one or more PLMNs. Alternatively, the SIB (e.g., SIB1) may include an aerial-specific PLMN-identity list identifying PLMNs dedicated to aerial UEs.

In any case, the aerial UE 525 may select either the first PLMN 505, the second PLMN 510, or both for subsequent communications based on a mission status of the aerial UE 525, the first PLMN 505 being dedicated to aerial UEs, and the second PLMN 510 being available to aerial UEs and non-aerial UEs. In some aspects, the aerial UE 525 may connect to the first PLMN 505 for communications via the first cell and to the second PLMN 510 for auxiliary communications via the first cell or the second cell. Auxiliary communications may refer to communications other than flight operations (e.g., C2 communications), such as payload communications (e.g., video data, sensor data, or other non-flight operations related data).

In one example, the wireless communications system 500 may define a throughput limit or data-rate limit or threshold for operation over aerial bands supported by the first PLMN 505. The throughput or data-rate threshold may be defined such that the aerial UE 525 may utilize the connection for the first PLMN if a throughput or data-rate required to support all services (e.g., at the aerial UE 525) is below the threshold. Otherwise, the aerial UE 525 may move the signaling of commercial payloads over to the second PLMN 510. In some cases, the first PLMN may operate in bands dedicated for aerial communications and the second PLMN may operate in non-aerial bands (e.g., bands available to aerial UEs and non-aerial UEs).

In another example, the regulators may determine to avoid a mix of different types of traffic on any bands. That is, the regulators may not want a mix of flight operation traffic and commercial payloads at any level. In this example, it may be appropriate for the aerial UE 525 to support simultaneous communications with the first PLMN 505 and the second PLMN 510 (e.g., dual PLMN). The aerial UE 525 may support dual subscriber identity module (SIM) dual active (DSDA), and the aerial UE 525 may communicate with the first PLMN 505 via a first SIM and the second PLMN 510 via a second SIM. That is, the aerial UE 525 may have different subscriber identities and different subscriptions for the connections associated with the first PLMN 505 and the second PLMN 510. Alternatively, the aerial UE 525 may support a split bearer, and the aerial UE 525 may communicate with the first PLMN 505 and the second PLMN 510 using the split bearer (e.g., using a same SIM).

In some cases, the first PLMN 505 (e.g., aerial-only PLMN) may not support emergency calls. In other cases, however, the first PLMN 505 may support emergency calls. In the event that aerial UEs support making emergency calls, the aerial UEs may be allowed to use the first PLMN 505 as well as other PLMNs supporting emergency calls (e.g., the second PLMN 510) as needed to make the emergency calls. Further, emergency calls may be supported for non-aerial UEs via the first PLMN (e.g., when the first PLMN is the only available network).

Figure 6:
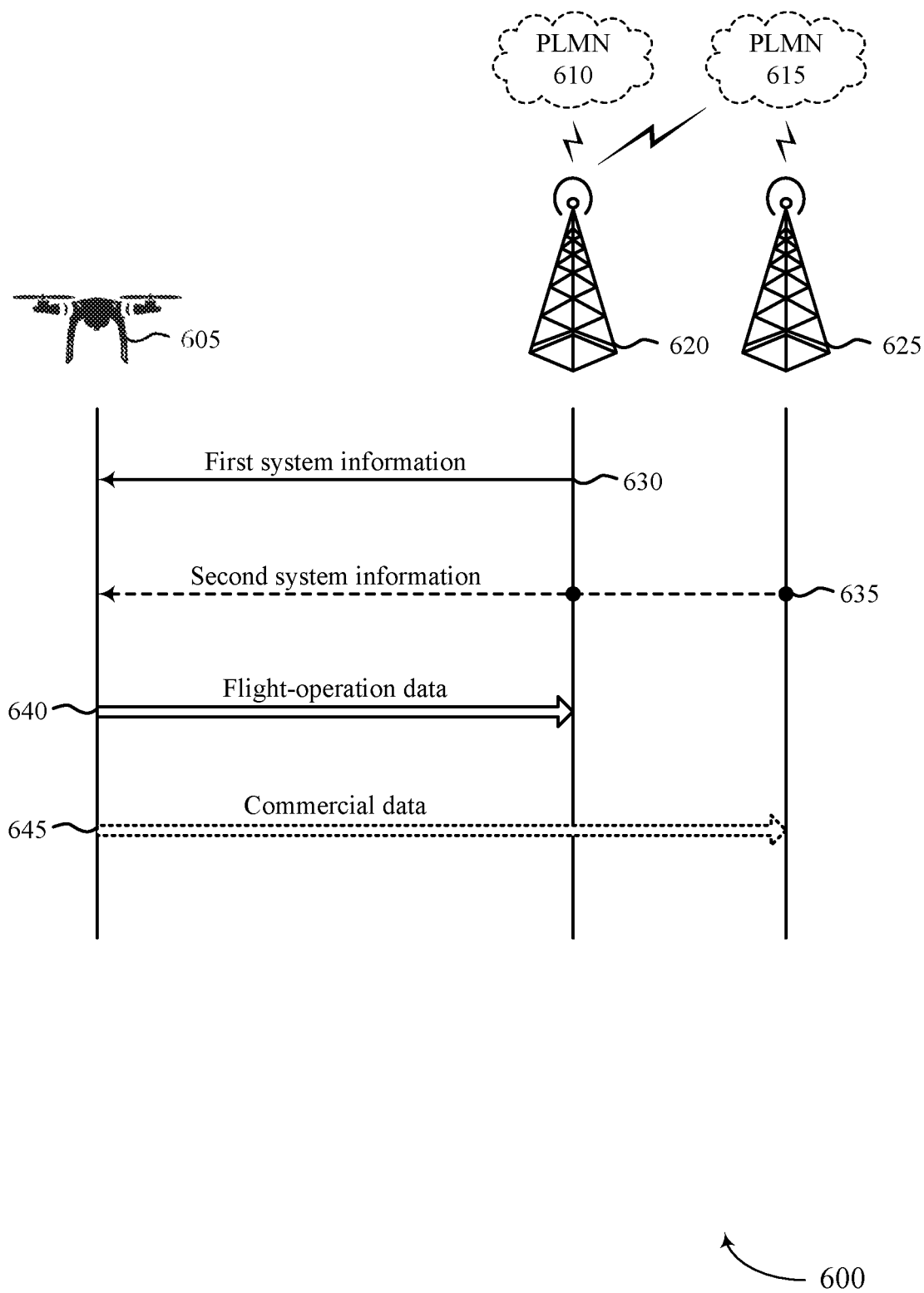
FIG. 6 illustrates an example of a process flow that supports cell selection, network selection, tracking area management, and paging for aerial operation in accordance with aspects of the present disclosure.

FIG. 6 illustrates an example of a process flow 600 that supports cell selection, network selection, tracking area management, and paging for aerial operation in accordance with aspects of the present disclosure. Process flow 600 includes an aerial UE 605, a first PLMN 610, a second PLMN 615, a first cell 620, and a second cell 625, which may be examples of corresponding devices described with reference to FIGS. 1-5. In the following description of the process flow 600, the signaling exchanged between the aerial UE 605, the first cell 620, and the second cell 625 may be exchanged in a different order than the example order shown, or the operations performed by the aerial UE 605, the first cell 620, and the second cell 625 may be performed in different orders or at different times. Some operations may also be omitted from the process flow 600, and other operations may be added to the process flow 600.

At 630, the first cell may transmit, and the aerial UE 605 may receive, first system information, and, at 635, the second cell may transmit, and the aerial UE 605 may receive, second system information. The aerial UE 605 may receive, in the first system information from the first cell 620, an indication of the first PLMN 610 dedicated to aerial UEs. The aerial UE 605 may also receive, in the first system information from the first cell 620 or in the second system information from the second cell 625, an indication of the second PLMN 615 available to aerial UEs and non-aerial UEs. The aerial UE 605 may then connect to the first PLMN 610 for communications via the first cell and to the second PLMN 615 for auxiliary communications via the first cell or the second cell. In some examples, the aerial UE 605 may connect to the first PLMN 610 and the second PLMN 615 based on the aerial UE 605 being in an aerial state.

In some cases, the aerial UE 605 may determine that the amount of data for transmission to the first PLMN 610 via the first cell 620 exceeds the threshold. In such cases, the aerial UE 605 may transmit a first portion of the data to the first network via the first cell and a second portion of the data to the second network via the first cell or the second cell. If the first cell 620 is connected to only the first PLMN 610, then, at 640, the aerial UE 605 may transmit flight operation data and potentially some auxiliary data to the first PLMN 610 via the first cell 620, and, at 645, the aerial UE 605 may transmit any remaining auxiliary data to the second PLMN 615 via the second cell 625. Alternatively, if the first cell 620 is connected to both the first PLMN 610 and the second PLMN 615, then, at 640, the aerial UE 605 may transmit flight operation data and potentially some auxiliary data to the first PLMN 610 via the first cell 620, and the aerial UE 605 may transmit any remaining auxiliary data to the second PLMN 615 via the first cell 620.

In other cases, the aerial UE 605 may determine that the amount of data for transmission to the first PLMN 610 via the first cell 620 is below the threshold. In such cases, the aerial UE 605 may transmit the data to the first PLMN 610 via the first cell 620. Specifically, at 640, the aerial UE 605 may transmit flight operation data and potentially some auxiliary data to the first PLMN 610 via the first cell 620. In yet other cases, the aerial UE 605 may simply be configured to transmit flight operation data to the first PLMN 610 and auxiliary data to the second PLMN 615. In such cases, if the first cell 620 is connected to only the first PLMN 610, then, at 640, the aerial UE 605 may transmit flight operation data to the first PLMN 610 via the first cell 620, and, at 645, the aerial UE 605 may transmit auxiliary data to the second PLMN 615 via the second cell 625. Alternatively, if the first cell 620 is connected to the first PLMN 610 and the second PLMN 615, then, at 640, the aerial UE 605 may transmit flight operation data to the first PLMN 610 via the first cell 620, and, at 645, the aerial UE 605 may transmit auxiliary data to the second PLMN 615 via the first cell 620.

In some aspects, the first PLMN may support emergency calls by aerial UEs, non-aerial UEs, or both. In some aspects, the first system information (e.g., at 630) includes a first network identity list indicating the first PLMN 610, and the second system information (e.g., at 635) includes a second network identity list indicating the second PLMN 615. In some aspects, the aerial UE 605 may communicate with the first PLMN 610 via the first cell 620 using a first SIM, and the aerial UE 605 may communicate with the second PLMN 615 via the second cell 625 using a second SIM. In some aspects, the aerial UE 605 may communicate with the first PLMN 610 via the first cell 620 and the second PLMN 615 via the second cell 625 over a split bearer using a single SIM.

Figure 7:
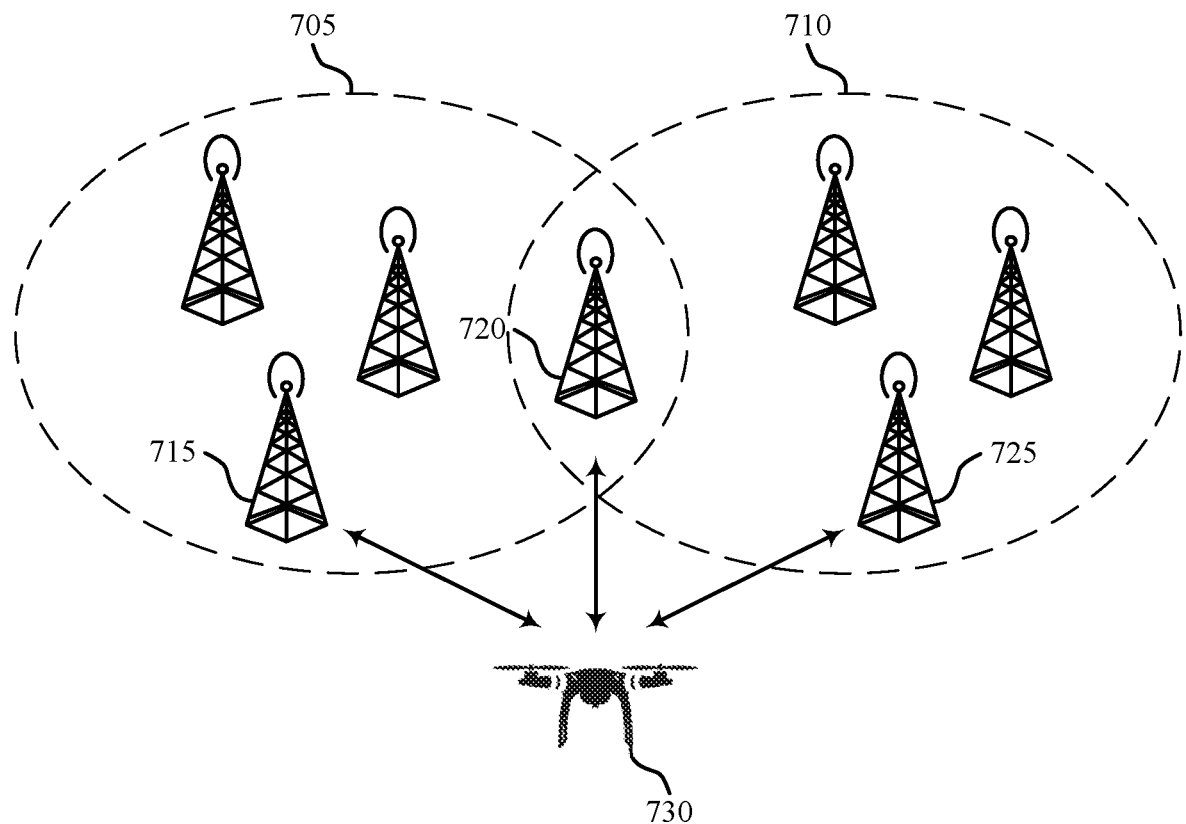
FIG. 7 illustrates an example of a wireless communications system that supports cell selection, network selection, tracking area management, and paging for aerial operation in accordance with aspects of the present disclosure.

FIG. 7 illustrates an example of a wireless communications system 700 that supports cell selection, network selection, tracking area management, and paging for aerial operation in accordance with aspects of the present disclosure. Wireless communications system 700 includes a first tracking area 705, a second tracking area 710, a first cell 715, a second cell 720, a third cell 725, and an aerial UE 730. When the aerial UE 730 is in operation (e.g., flying), the aerial UE 730 may be in a connected mode, idle mode, or inactive mode. The wireless communications system 700 (e.g., network) may be able to page the aerial UE 730 regardless of the mission status of the aerial UE 730 (e.g., whether the aerial UE 730 is on the ground or in the sky).

The first tracking area 705 or the second tracking area 710 may consist of only cells dedicated to aerial UEs (e.g., aerial cells) or cells dedicated to aerial UEs and cells available to aerial UEs and non-aerial UEs (e.g., hybrid cells). In some cases, wireless communications system 700 may support non-mixed tracking areas, where the first tracking area 705 consists of cells supporting communications on bands dedicated to aerial UEs, and the second tracking area 710 consists of cells supporting communications on bands available to aerial UEs and non-aerial UEs. In such cases, a cell available to aerial UEs and non-aerial UEs (e.g., a hybrid cell, such as the second cell 720) may belong to both the first tracking area 705 and the second tracking area 710 (e.g., a cell may belong to an aerial tracking area and a non-aerial tracking area).

In FIG. 7, the first tracking area 705 may include only cells available to aerial UEs and non-aerial UEs, and the second tracking area 710 may include one or more cells dedicated to aerial UEs. Thus, the second tracking area 710 may support communications with the aerial UE 730 when the aerial UE 730 is in an aerial state, and the second tracking area may be said to support the aerial state. The aerial UE 730 may either be in communication with the first cell 715, the second cell 720, or the third cell 725 while operating in a ground state. The aerial UE 730 may then determine to transition to an aerial state. After transitioning to the aerial state, it may be appropriate for the aerial UE 730 to determine whether to transmit a TAU.

If the aerial UE 730 is in communication with the first cell 715, and the first tracking area 705 fails to support the aerial state, the aerial UE 730 may connect to a cell in the second tracking area 710 since the second tracking area 710 supports the aerial state. The aerial UE 730 may then transmit a TAU based on connecting to the cell in the second tracking area 710. If the aerial UE 730 is in communications with the second cell 720, the aerial UE 730 may suppress transmission of a TAU based on the second cell 720 being in the second tracking area 710 that supports the aerial state. If the aerial UE is in communications with the third cell 725, the aerial UE 730 may also suppress transmission of a TAU based on the third cell 725 being in the second tracking area 710 that supports the aerial state. Thus, if the aerial UE 730 is in communications with the second cell 720 or the third cell 725, there should be no need to update a tracking area because of a change in mission status (e.g., from non-flying to flying). Because the aerial UE 730 may have to connect to a cell in a different tracking area after changing mission statuses, the aerial UE 730 may transmit or suppress transmission of a TAU based on changing mission statuses.

Figure 8:
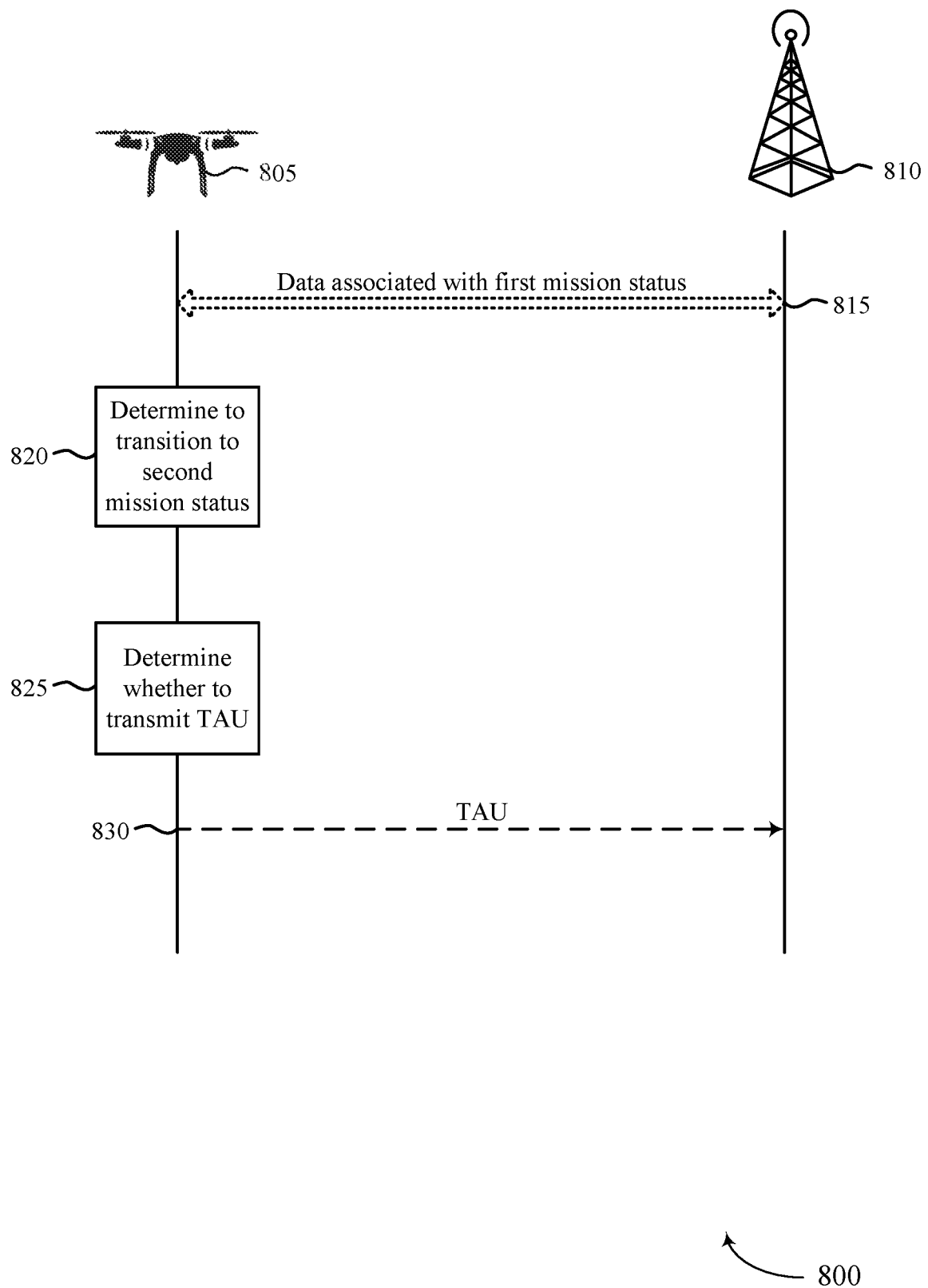
FIG. 8 illustrates an example of a process flow that supports cell selection, network selection, tracking area management, and paging for aerial operation in accordance with aspects of the present disclosure.

FIG. 8 illustrates an example of a process flow 800 that supports cell selection, network selection, tracking area management, and paging for aerial operation in accordance with aspects of the present disclosure. Process flow 800 includes an aerial UE 805 and a cell 810 in a tracking area, which may be examples of corresponding devices described with reference to FIGS. 1-7. In the following description of the process flow 800, the signaling exchanged between the aerial UE 805 and the cell 810 may be exchanged in a different order than the example order shown, or the operations performed by the aerial UE 805 and the cell 810 may be performed in different orders or at different times. Some operations may also be omitted from the process flow 800, and other operations may be added to the process flow 800.

At 815, the aerial UE 805 may communicate (e.g., exchange data) with the cell 810 in the tracking area while in a first mission status. At 820, the aerial UE 805 may determine to transition to a second mission status. At 825, the aerial UE 805 may determine whether to transmit a TAU based on whether the tracking area (e.g., that includes the cell 810) supports the second mission status.

In one aspect, the aerial UE 805 may connect to another cell in another tracking area if the tracking area fails to support the second mission status, and, at 830, the aerial UE 805 may transmit a TAU based on connecting to the other cell in the other tracking area. In this aspect, the tracking area may include cells available to aerial UEs, and the other tracking area may include cells dedicated to aerial UEs. In another aspect, the aerial UE 805 may suppress transmission of a TAU if the tracking area supports the second mission status. In this aspect, the tracking area may include cells dedicated to aerial UEs. In yet another aspect, the aerial UE 805 may suppress transmission of a TAU if the cell 810 is also in another tracking area that supports the second mission status.

Figure 9:
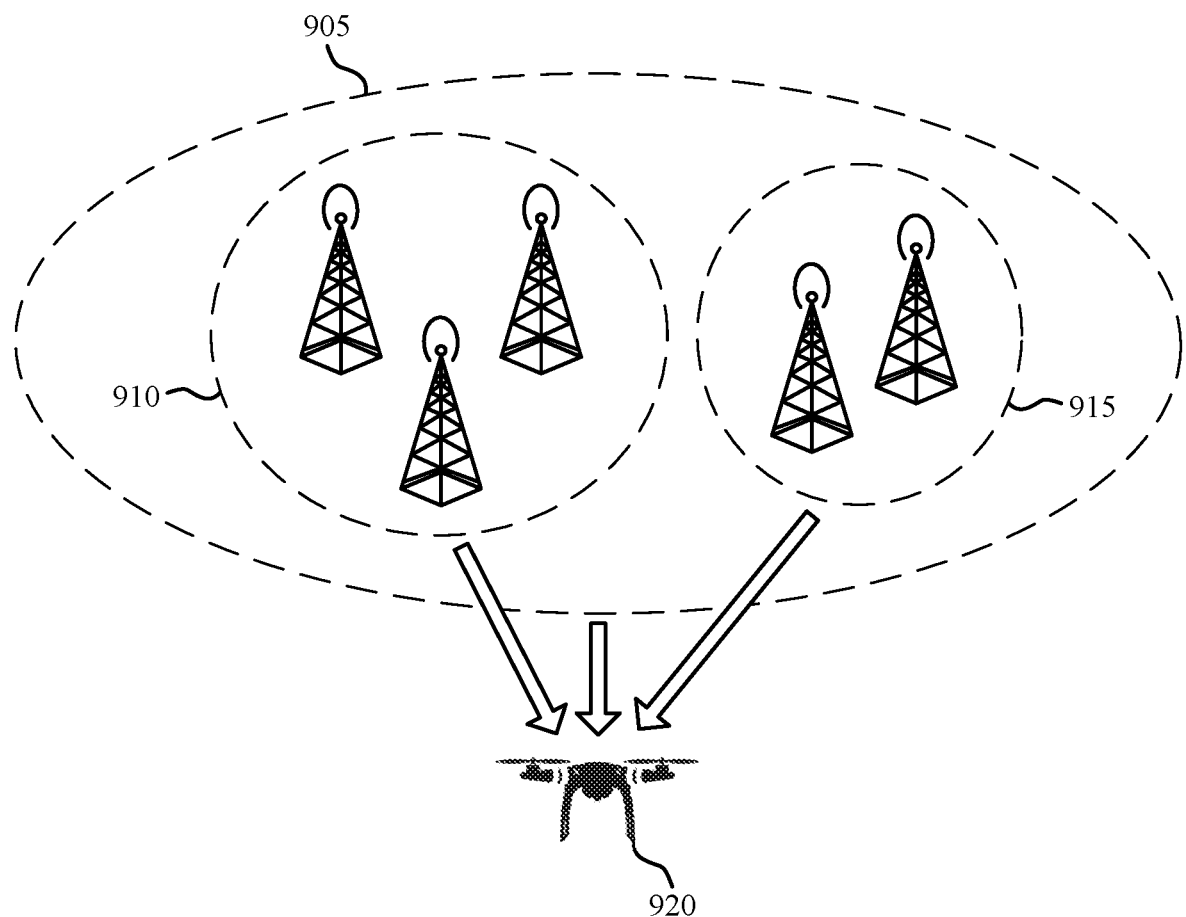
FIG. 9 illustrates an example of a wireless communications system that supports cell selection, network selection, tracking area management, and paging for aerial operation in accordance with aspects of the present disclosure.

FIG. 9 illustrates an example of a wireless communications system 900 that supports cell selection, network selection, tracking area management, and paging for aerial operation in accordance with aspects of the present disclosure. Wireless communications system 900 includes a tracking area 905, a first set of cells 910 dedicated to aerial UEs, a second set of cells 915 available to aerial UEs and non-aerial UEs, and an aerial UE 920. The aerial UE 920 may be operating in an aerial state. Because the tracking area 905 may include the first set of cells 910 dedicated to aerial UEs and the second set of cells 915 available to aerial UEs and non-aerial UEs, the tracking area 905 may be referred to as a mixed tracking area. In the case of a mixed tracking area (e.g., a tracking area consisting of both aerial cells and non-aerial cells), if a network is aware of a mission status of an aerial UE, the network may use the mission status in a paging decision.

In FIG. 9, a base station 105 (e.g., a network) may first page the aerial UE 920 via the first set of cells 910 dedicated to aerial UEs (e.g., the aerial-only cells). If the aerial UE 920 fails to respond to the paging via the first set of cells 910 (e.g., the base station 105 fails to receive a response from the aerial UE 920 to the paging via the first set of cells 910), the base station 105 may page the aerial UE 920 via the first set of cells 910 dedicated to aerial UEs and the second set of cells 915 available to aerial UEs and non-aerial UEs. That is, the base station 105 may expand a paging area to the whole tracking area 905 or service area. Alternatively, if the aerial UE 920 fails to respond to the paging via the first set of cells 910 (e.g., the base station 105 fails to receive a response from the aerial UE 920 to the paging via the first set of cells 910), the base station 105 may page the aerial UE 920 via the second set of cells 915 available to aerial UEs and non-aerial UEs. Because the aerial UE 920 may be connected to a cell dedicated to aerial UEs when in an aerial state (e.g., flying status), the paging via the first set of cells 910 is likely to be successful. That is, the base station 105 may use the flying status of the aerial UE 920 in a paging decision (e.g., for paging).

Figure 10:
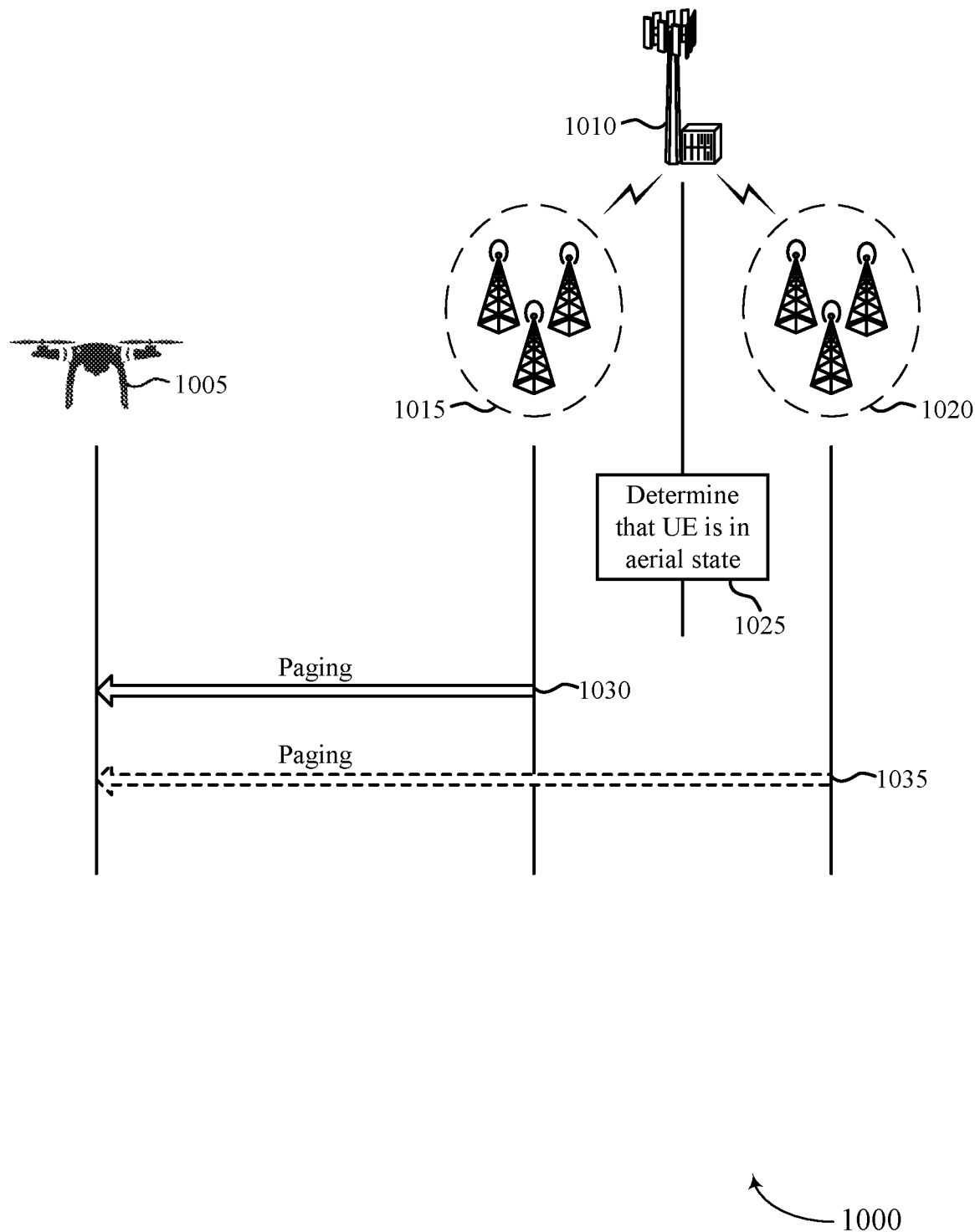
FIG. 10 illustrates an example of a process flow that supports cell selection, network selection, tracking area management, and paging for aerial operation in accordance with aspects of the present disclosure.

FIG. 10 illustrates an example of a process flow 1000 that supports cell selection, network selection, tracking area management, and paging for aerial operation in accordance with aspects of the present disclosure. Process flow 1000 includes an aerial UE 1005, a base station 1010, a first set of cells 1015 dedicated to aerial UEs, and a second set of cells 1020 available to aerial UEs and non-aerial UEs. In the following description of the process flow 1000, the signaling exchanged between the aerial UE 1005 and the base station 1010 via the first set of cells 1015 or the second set of cells 1020 may be exchanged in a different order than the example order shown, or the operations performed by the aerial UE 1005 and the base station 1010 may be performed in different orders or at different times. Some operations may also be omitted from the process flow 1000, and other operations may be added to the process flow 1000.

The base station 1010 may identify that the aerial UE 1005 is connected to a cell within a tracking area, where the tracking area includes the first set of cells 1015 dedicated to aerial UEs and the second set of cells 1020 available to aerial UEs and non-aerial UEs. At 1025, the base station 1010 may determine a mission status of the aerial UE 1005. The base station 1010 may then page the aerial UE 1005 based on the mission status of the aerial UE 1005. At 1030, the base station 1010 may page the aerial UE 1005 via the first set of cells 1015 dedicated to aerial UEs in the tracking area if the aerial UE 1005 is in an aerial state. At 1035, the base station 1010 may then page the aerial UE 1005 via the first set of cells 1015 and the second set of cells 1020 if the base station 1010 failed to receive a response to the paging via the first set of cells 1015 dedicated to aerial UEs. Alternatively, at 1035, the base station 1010 may page the aerial UE 1005 via the second set of cells 1020 if the base station 1010 failed to receive a response to the paging via the first set of cells 1015 dedicated to aerial UEs.

Figure 11:
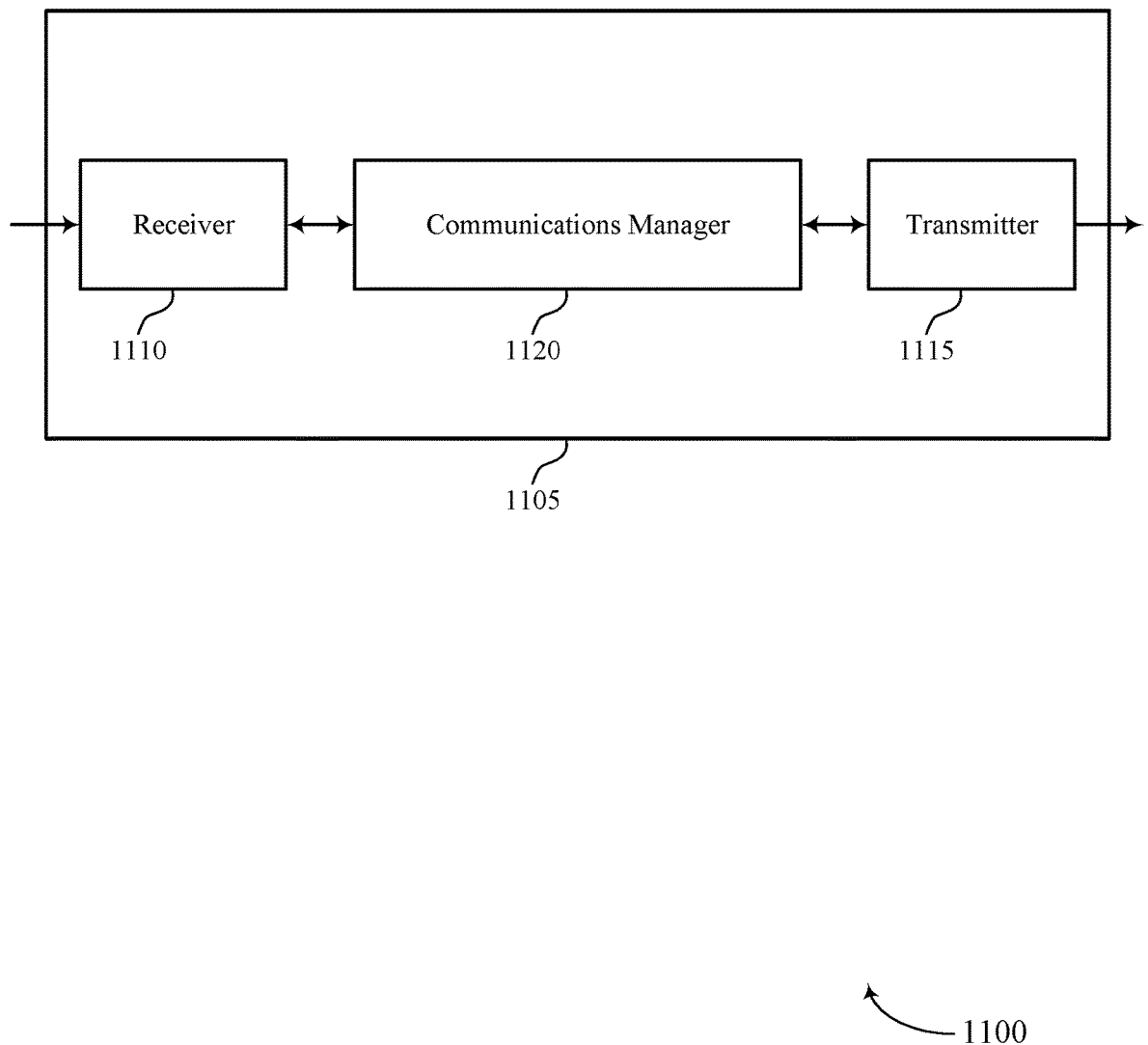
FIGS. 11 and 12 show block diagrams of devices that support cell selection, network selection, tracking area management, and paging for aerial operation in accordance with aspects of the present disclosure.

FIG. 11 shows a block diagram 1100 of a device 1105 that supports cell selection, network selection, tracking area management, and paging for aerial operation in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to cell selection, network selection, tracking area management, and paging for aerial operation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to cell selection, network selection, tracking area management, and paging for aerial operation). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of cell selection, network selection, tracking area management, and paging for aerial operation as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at an aerial UE in accordance with examples as disclosed herein. For example, the communications manager 1120 may be configured as or otherwise support a means for receiving first system information indicating a first priority of a first cell for cell selection for aerial UEs. The communications manager 1120 may be configured as or otherwise support a means for receiving second system information indicating a second priority of a second cell for cell selection for aerial UEs. The communications manager 1120 may be configured as or otherwise support a means for identifying a mission status of the aerial UE. The communications manager 1120 may be configured as or otherwise support a means for selecting the first cell or the second cell for communications based on the first priority of the first cell, the second priority of the second cell, and the mission status of the aerial UE.

Additionally, or alternatively, the communications manager 1120 may support wireless communication at an aerial UE in accordance with examples as disclosed herein. For example, the communications manager 1120 may be configured as or otherwise support a means for receiving, in first system information from a first cell, an indication of a first network dedicated to aerial UEs. The communications manager 1120 may be configured as or otherwise support a means for receiving, in the first system information from the first cell or in second system information from a second cell, an indication of a second network available to aerial UEs and non-aerial UEs. The communications manager 1120 may be configured as or otherwise support a means for connecting to the first network for communications via the first cell and to the second network for auxiliary communications via the first cell or the second cell.

Additionally, or alternatively, the communications manager 1120 may support wireless communication at an aerial UE in accordance with examples as disclosed herein. For example, the communications manager 1120 may be configured as or otherwise support a means for communicating with a cell in a tracking area while in a first mission status. The communications manager 1120 may be configured as or otherwise support a means for determining to transition to a second mission status. The communications manager 1120 may be configured as or otherwise support a means for determining whether to transmit a TAU based on whether the tracking area supports the second mission status.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources. In particular, the techniques described herein may allow for efficient cell selection, network selection, tracking area management, and paging for aerial operation such that aerial UEs may maximize the potential of resources dedicated to the aerial UEs.

Figure 12:
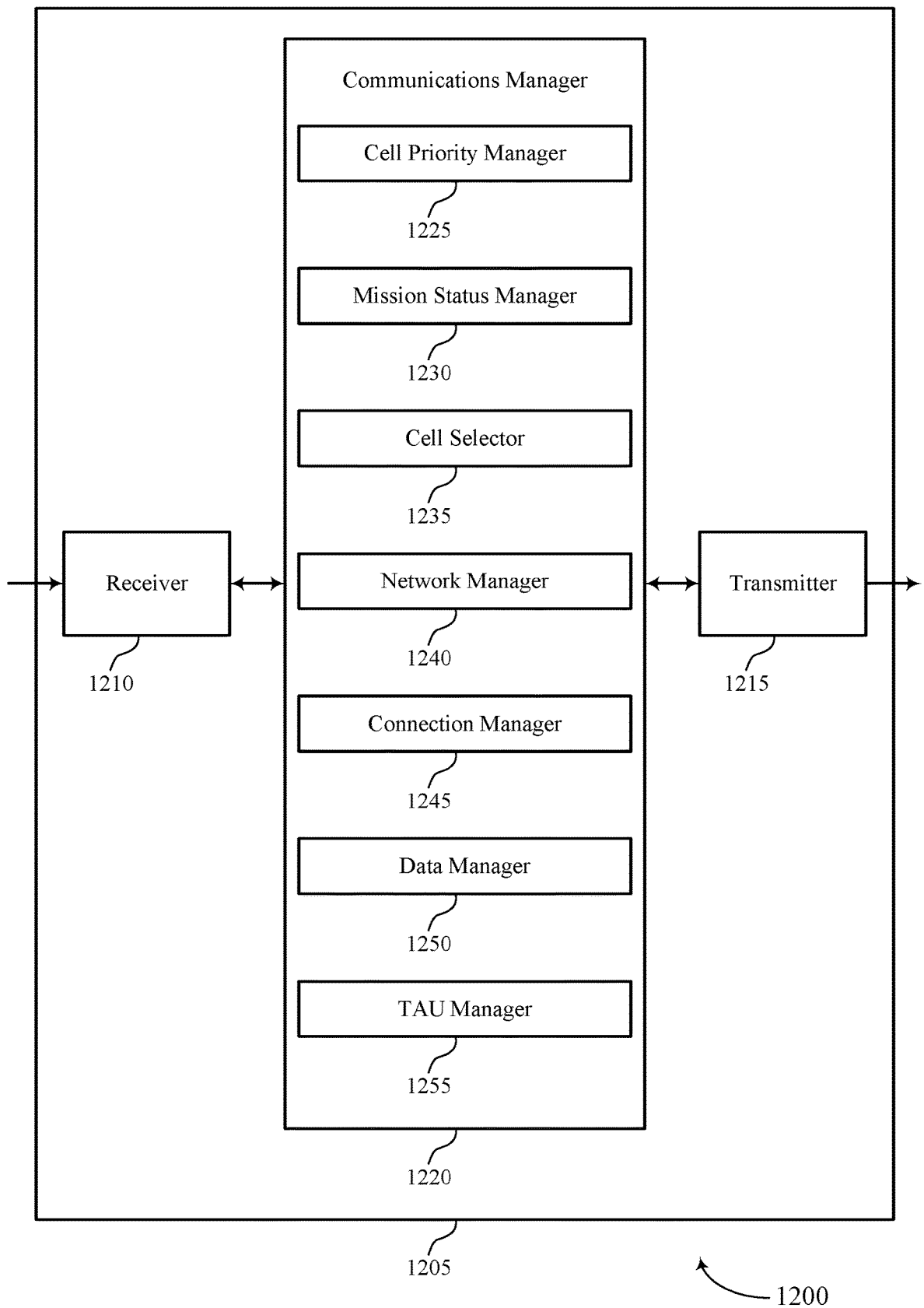

FIG. 12 shows a block diagram 1200 of a device 1205 that supports cell selection, network selection, tracking area management, and paging for aerial operation in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to cell selection, network selection, tracking area management, and paging for aerial operation). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to cell selection, network selection, tracking area management, and paging for aerial operation). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of cell selection, network selection, tracking area management, and paging for aerial operation as described herein. For example, the communications manager 1220 may include a cell priority manager 1225, a mission status manager 1230, a cell selector 1235, a network manager 1240, a connection manager 1245, a data manager 1250, a TAU manager 1255, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at an aerial UE in accordance with examples as disclosed herein. The cell priority manager 1225 may be configured as or otherwise support a means for receiving first system information indicating a first priority of a first cell for cell selection for aerial UEs. The cell priority manager 1225 may be configured as or otherwise support a means for receiving second system information indicating a second priority of a second cell for cell selection for aerial UEs. The mission status manager 1230 may be configured as or otherwise support a means for identifying a mission status of the aerial UE. The cell selector 1235 may be configured as or otherwise support a means for selecting the first cell or the second cell for communications based on the first priority of the first cell, the second priority of the second cell, and the mission status of the aerial UE.

Additionally, or alternatively, the communications manager 1220 may support wireless communication at an aerial UE in accordance with examples as disclosed herein. The network manager 1240 may be configured as or otherwise support a means for receiving, in first system information from a first cell, an indication of a first network dedicated to aerial UEs. The network manager 1240 may be configured as or otherwise support a means for receiving, in the first system information from the first cell or in second system information from a second cell, an indication of a second network available to aerial UEs and non-aerial UEs. The connection manager 1245 may be configured as or otherwise support a means for connecting to the first network for communications via the first cell and to the second network for auxiliary communications via the first cell or the second cell.

Additionally, or alternatively, the communications manager 1220 may support wireless communication at an aerial UE in accordance with examples as disclosed herein. The data manager 1250 may be configured as or otherwise support a means for communicating with a cell in a tracking area while in a first mission status. The mission status manager 1230 may be configured as or otherwise support a means for determining to transition to a second mission status. The TAU manager 1255 may be configured as or otherwise support a means for determining whether to transmit a TAU based on whether the tracking area supports the second mission status.

Figure 13:
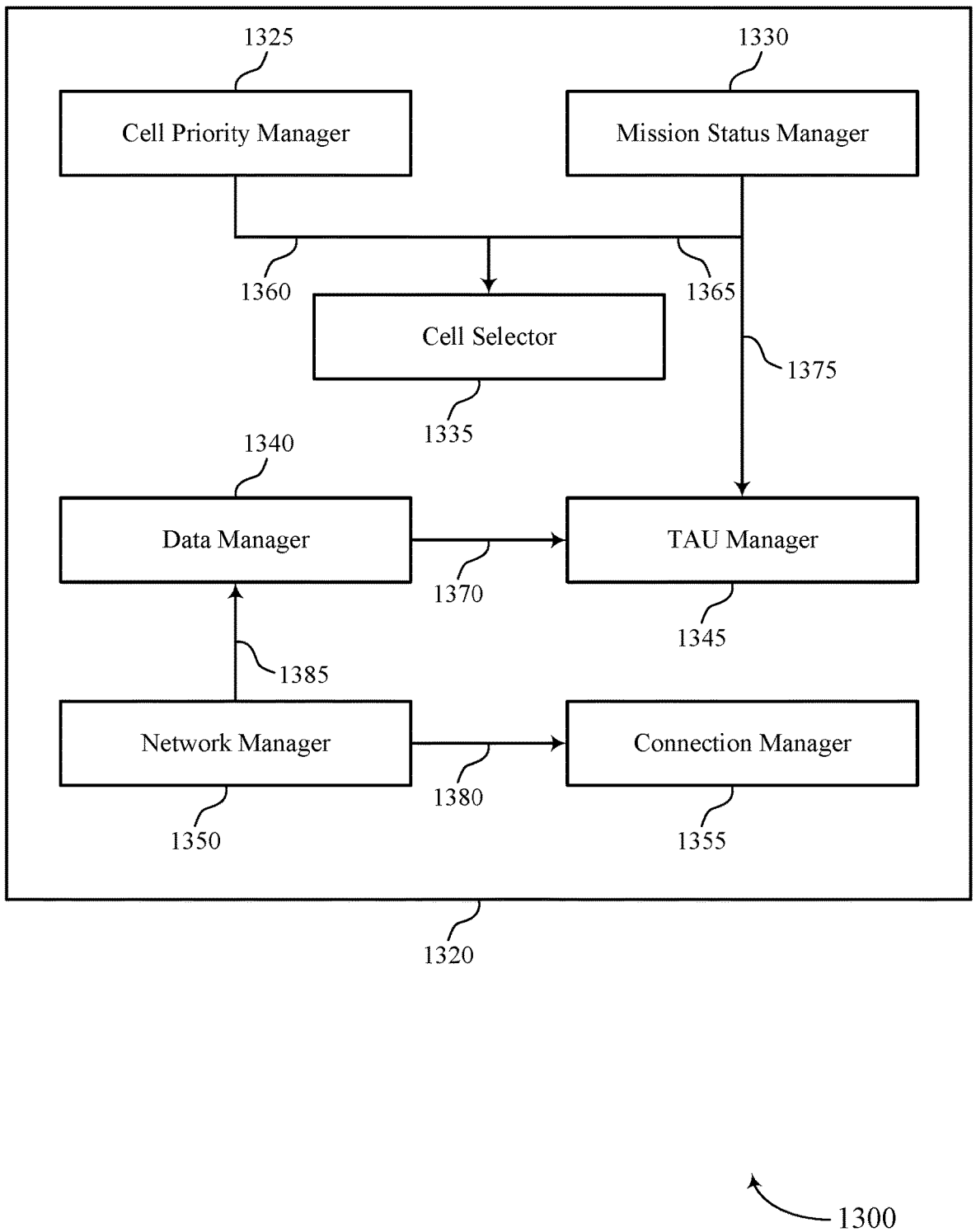
FIG. 13 shows a block diagram of a communications manager that supports cell selection, network selection, tracking area management, and paging for aerial operation in accordance with aspects of the present disclosure.

FIG. 13 shows a block diagram 1300 of a communications manager 1320 that supports cell selection, network selection, tracking area management, and paging for aerial operation in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of cell selection, network selection, tracking area management, and paging for aerial operation as described herein. For example, the communications manager 1320 may include a cell priority manager 1325, a mission status manager 1330, a cell selector 1335, a data manager 1340, a TAU manager 1345, a network manager 1350, a connection manager 1355, or any combination thereof. Each of these components may communicate, directly or indirectly, with one another (e.g., via one or more buses).

The communications manager 1320 may support wireless communication at an aerial UE in accordance with examples as disclosed herein. The cell priority manager 1325 may be configured as or otherwise support a means for receiving first system information indicating a first priority of a first cell for cell selection for aerial UEs. In some examples, the cell priority manager 1325 may be configured as or otherwise support a means for receiving second system information indicating a second priority of a second cell for cell selection for aerial UEs. The mission status manager 1330 may be configured as or otherwise support a means for identifying a mission status of the aerial UE. The cell priority manager 1325 may pass the first and second priorities 1360 of the first and second cells to the cell selector 1335, and the mission status manager 1330 may pass the mission status 1365 of the aerial UE to the cell selector 1335. The cell selector 1335 may be configured as or otherwise support a means for selecting the first cell or the second cell for communications based on the first priority of the first cell, the second priority of the second cell, and the mission status of the aerial UE.

In some examples, to support receiving the first system information indicating the first priority of the first cell and the second system information indicating the second priority of the second cell, the cell priority manager 1325 may be configured as or otherwise support a means for receiving the first system information indicating a first set of multiple priorities of the first cell each corresponding to a different mission status of the aerial UE. In some examples, to support receiving the first system information indicating the first priority of the first cell and the second system information indicating the second priority of the second cell, the cell priority manager 1325 may be configured as or otherwise support a means for receiving the second system information indicating a second set of multiple priorities of the second cell each corresponding to a different mission status of the aerial UE.

In some examples, the cell priority manager 1325 may be configured as or otherwise support a means for determining to use the first priority of the first cell from the first set of multiple priorities of the first cell for cell selection based on the mission status of the aerial UE. In some examples, the cell priority manager 1325 may be configured as or otherwise support a means for determining to use the second priority of the second cell of the second set of multiple priorities of the second cell for cell selection based on the mission status of the aerial UE.

In some examples, the mission status of the aerial UE includes an aerial state, a ground state, a pre-flight state, or a post-flight state. In some examples, the first priority of the first cell corresponds to a first level of support for aerial UEs at the first cell, and the second priority of the second cell corresponds to a second level of support for aerial UEs at the second cell. In some examples, the first cell or the second cell is dedicated to aerial UEs or available to aerial UEs and non-aerial UEs.

Additionally, or alternatively, the communications manager 1320 may support wireless communication at an aerial UE in accordance with examples as disclosed herein. The data manager 1340 may be configured as or otherwise support a means for communicating with a cell in a tracking area while in a first mission status. In some examples, the mission status manager 1330 may be configured as or otherwise support a means for determining to transition to a second mission status. The data manager 1340 may pass an indication 1370 that the aerial UE is communicating with the cell in the tracking area to the TAU manager 1345, and the mission status manager may pass the second mission status 1375 to the TAU manager 1345. The TAU manager 1345 may be configured as or otherwise support a means for determining whether to transmit a TAU based on whether the tracking area supports the second mission status.

In some examples, the cell includes a first cell, and the connection manager 1355 may be configured as or otherwise support a means for connecting to a second cell in a second tracking area if the first tracking area fails to support the second mission status. In some examples, the cell includes a first cell, and the TAU manager 1345 may be configured as or otherwise support a means for transmitting the TAU based on connecting to the second cell in the second tracking area. In some examples, the first tracking area includes cells available to aerial UEs and non-aerial UEs and the second tracking area includes cells dedicated to aerial UEs.

In some examples, the TAU manager 1345 may be configured as or otherwise support a means for suppressing transmission of the TAU if the tracking area supports the second mission status. In some examples, the tracking area includes cells dedicated to aerial UEs. In some examples, the tracking area includes a first tracking area, and the TAU manager 1345 may be configured as or otherwise support a means for suppressing transmission of the TAU if the cell supports the second mission status.

Additionally, or alternatively, the communications manager 1320 may support wireless communication at an aerial UE in accordance with examples as disclosed herein. The network manager 1350 may be configured as or otherwise support a means for receiving, in first system information from a first cell, an indication of a first network dedicated to aerial UEs. In some examples, the network manager 1350 may be configured as or otherwise support a means for receiving, in the first system information from the first cell or in second system information from a second cell, an indication of a second network available to aerial UEs and non-aerial UEs. The network manager 1350 may pass indications 1380 of the first network and the second network to the connection manager 1355. The connection manager 1355 may be configured as or otherwise support a means for connecting to the first network for communications via the first cell and to the second network for auxiliary communications via the first cell or the second cell.

The network manager 1350 may also pass indications 1385 of the first network and the second network to the data manager 1340. In some examples, the data manager 1340 may be configured as or otherwise support a means for determining that an amount of data for transmission to the first network via the first cell exceeds a threshold. In some examples, the data manager 1340 may be configured as or otherwise support a means for transmitting a first portion of the data to the first network via the first cell and a second portion of the data to the second network via the first cell or the second cell based on the determining. In some examples, the first portion of the data includes flight-operation data, and the second portion of the data includes payload data.

In some examples, the data manager 1340 may be configured as or otherwise support a means for determining that an amount of data for transmission to the first network via the first cell is below a threshold. In some examples, the data manager 1340 may be configured as or otherwise support a means for transmitting the data to the first network via the first cell based on the determining. In some examples, the data includes flight-operation data and payload data.

In some examples, the data manager 1340 may be configured as or otherwise support a means for transmitting flight-operation data to the first network via the first cell and payload data to the second network via the second cell. In some examples, connecting to the first network and to the second network is based on the aerial UE being in an aerial state. In some examples, the first network dedicated to aerial UEs supports emergency calls by aerial UEs, non-aerial UEs, or both. In some examples, the first system information includes a first network identity list indicating the first network, and the second system information includes a second network identity list indicating the second network. In some examples, the first system information includes a network identity list indicating the first network and the second network.

In some examples, the aerial UE includes a first subscriber identity module and a second subscriber identity module, and the data manager 1340 may be configured as or otherwise support a means for communicating with the first network via the first cell using the first subscriber identity module at the aerial UE. In some examples, the aerial UE includes a first subscriber identity module and a second subscriber identity module, and the data manager 1340 may be configured as or otherwise support a means for communicating with the second network via the first cell or the second cell using the second subscriber identity module at the aerial UE. In some examples, the aerial UE includes a single subscriber identity module, and the data manager 1340 may be configured as or otherwise support a means for communicating, over a split bearer, with the first network via the first cell and the second network via the second cell using the single subscriber identity module at the aerial UE.

Figure 14:
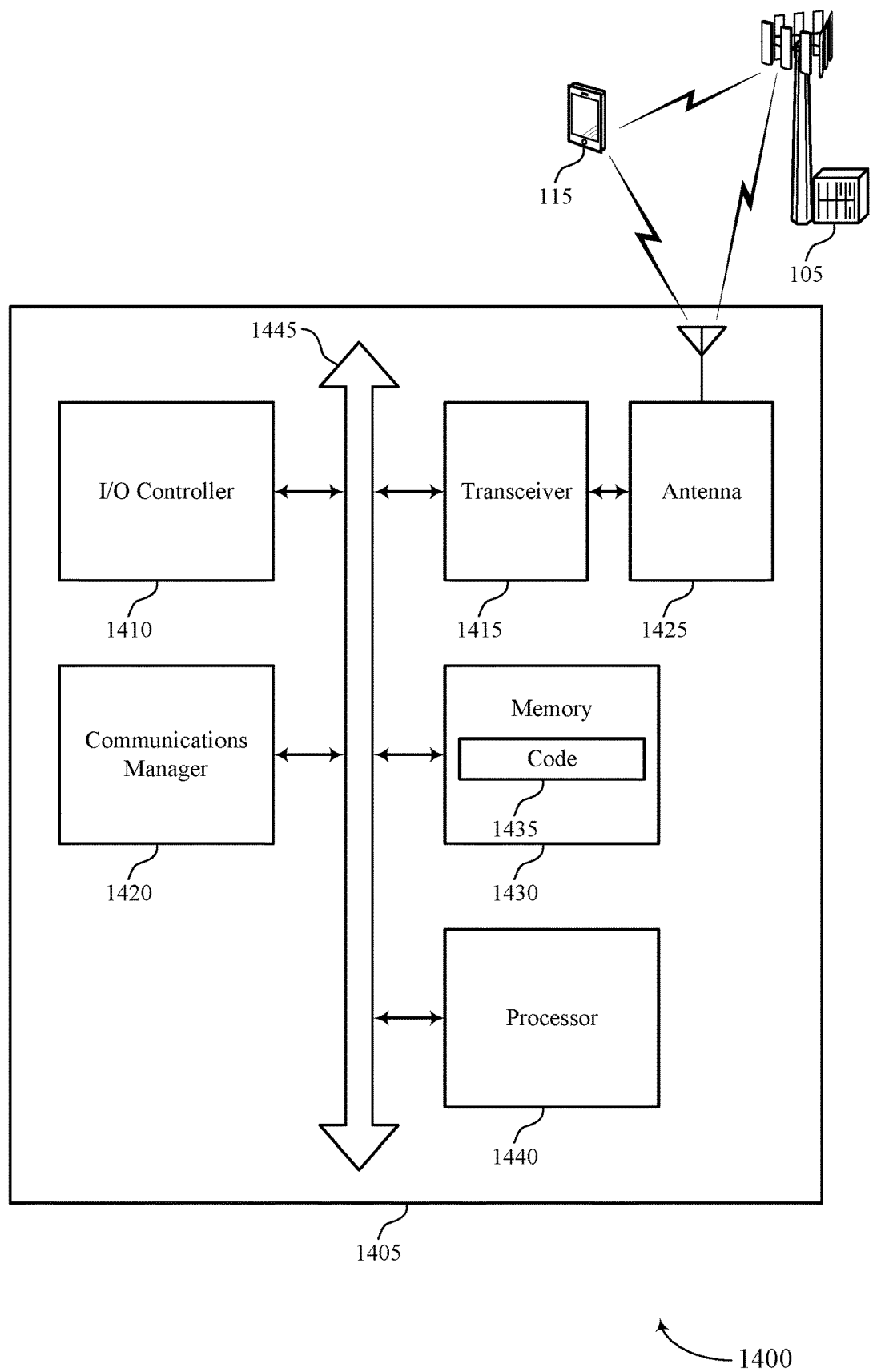
FIG. 14 shows a diagram of a system including a device that supports cell selection, network selection, tracking area management, and paging for aerial operation in accordance with aspects of the present disclosure.

FIG. 14 shows a diagram of a system 1400 including a device 1405 that supports cell selection, network selection, tracking area management, and paging for aerial operation in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting cell selection, network selection, tracking area management, and paging for aerial operation). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at an aerial UE in accordance with examples as disclosed herein. For example, the communications manager 1420 may be configured as or otherwise support a means for receiving first system information indicating a first priority of a first cell for cell selection for aerial UEs. The communications manager 1420 may be configured as or otherwise support a means for receiving second system information indicating a second priority of a second cell for cell selection for aerial UEs. The communications manager 1420 may be configured as or otherwise support a means for identifying a mission status of the aerial UE. The communications manager 1420 may be configured as or otherwise support a means for selecting the first cell or the second cell for communications based on the first priority of the first cell, the second priority of the second cell, and the mission status of the aerial UE.

Additionally, or alternatively, the communications manager 1420 may support wireless communication at an aerial UE in accordance with examples as disclosed herein. For example, the communications manager 1420 may be configured as or otherwise support a means for receiving, in first system information from a first cell, an indication of a first network dedicated to aerial UEs. The communications manager 1420 may be configured as or otherwise support a means for receiving, in the first system information from the first cell or in second system information from a second cell, an indication of a second network available to aerial UEs and non-aerial UEs. The communications manager 1420 may be configured as or otherwise support a means for connecting to the first network for communications via the first cell and to the second network for auxiliary communications via the first cell or the second cell.

Additionally, or alternatively, the communications manager 1420 may support wireless communication at an aerial UE in accordance with examples as disclosed herein. For example, the communications manager 1420 may be configured as or otherwise support a means for communicating with a cell in a tracking area while in a first mission status. The communications manager 1420 may be configured as or otherwise support a means for determining to transition to a second mission status. The communications manager 1420 may be configured as or otherwise support a means for determining whether to transmit a TAU based on whether the tracking area supports the second mission status.

By including or configuring the communications manager 1420 in accordance with examples as described herein, the device 1405 may support techniques for more efficient utilization of communication resources. In particular, the techniques described herein may allow for efficient cell selection, network selection, tracking area management, and paging for aerial operation such that aerial UEs may maximize the potential of resources dedicated to the aerial UEs.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of cell selection, network selection, tracking area management, and paging for aerial operation as described herein, or the processor 1440 and the memory 1430 may be otherwise configured to perform or support such operations.

Figure 15:
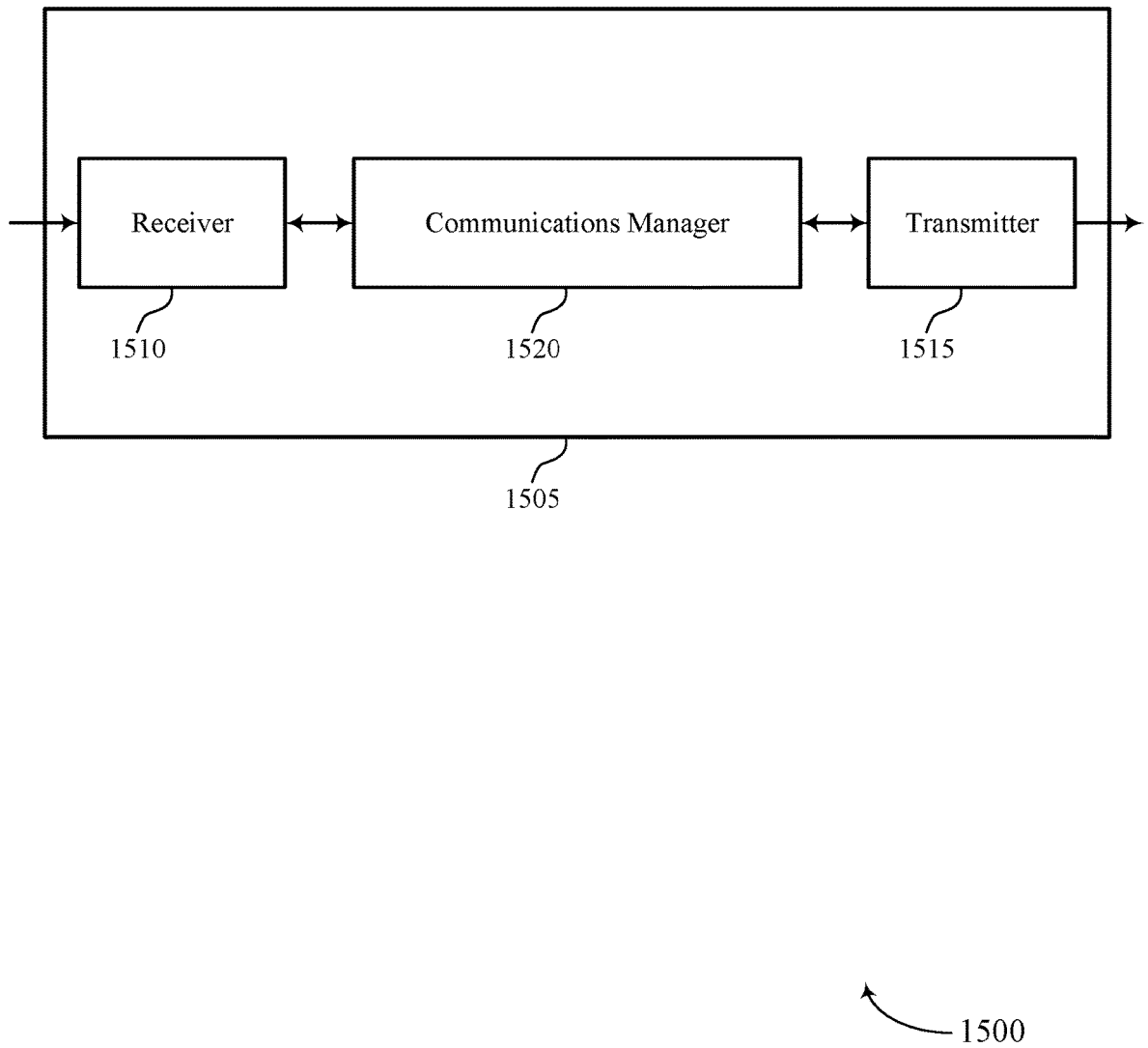
FIGS. 15 and 16 show block diagrams of devices that support cell selection, network selection, tracking area management, and paging for aerial operation in accordance with aspects of the present disclosure.

FIG. 15 shows a block diagram 1500 of a device 1505 that supports cell selection, network selection, tracking area management, and paging for aerial operation in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to cell selection, network selection, tracking area management, and paging for aerial operation). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to cell selection, network selection, tracking area management, and paging for aerial operation). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of cell selection, network selection, tracking area management, and paging for aerial operation as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting system information indicating a priority of a cell for cell selection for aerial user equipments (UEs). The communications manager 1520 may be configured as or otherwise support a means for connecting to an aerial UE for communications via the cell based on transmitting the system information indicating the priority of the cell.

Additionally, or alternatively, the communications manager 1520 may support wireless communication at a base station in accordance with examples as disclosed herein. For example, the communications manager 1520 may be configured as or otherwise support a means for identifying that an aerial UE is connected to a cell within a tracking area, the tracking area including a first set of cells dedicated to aerial UEs and a second set of cells available to aerial UEs and non-aerial UEs. The communications manager 1520 may be configured as or otherwise support a means for determining a mission status of the aerial UE. The communications manager 1520 may be configured as or otherwise support a means for paging the aerial UE via one or more cells in the tracking area based on the mission status of the aerial UE.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for more efficient utilization of communication resources. In particular, the techniques described herein may allow for efficient cell selection, network selection, tracking area management, and paging for aerial operation such that aerial UEs may maximize the potential of resources dedicated to the aerial UEs.

Figure 16:
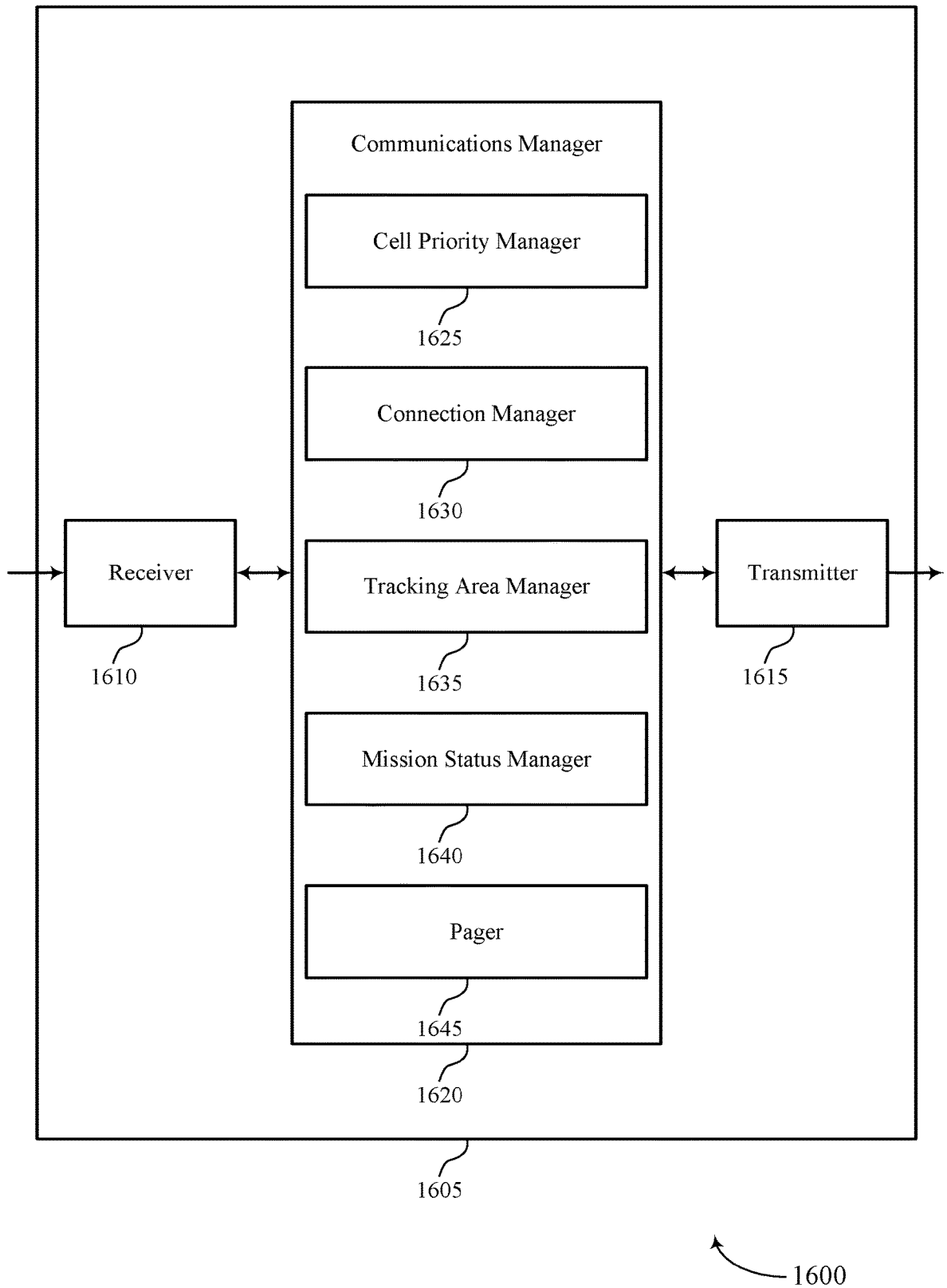

FIG. 16 shows a block diagram 1600 of a device 1605 that supports cell selection, network selection, tracking area management, and paging for aerial operation in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to cell selection, network selection, tracking area management, and paging for aerial operation). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to cell selection, network selection, tracking area management, and paging for aerial operation). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of cell selection, network selection, tracking area management, and paging for aerial operation as described herein. For example, the communications manager 1620 may include a cell priority manager 1625, a connection manager 1630, a tracking area manager 1635, a mission status manager 1640, a pager 1645, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The cell priority manager 1625 may be configured as or otherwise support a means for transmitting system information indicating a priority of a cell for cell selection for aerial UEs. The connection manager 1630 may be configured as or otherwise support a means for connecting to an aerial UE for communications via the cell based on transmitting the system information indicating the priority of the cell.

Additionally, or alternatively, the communications manager 1620 may support wireless communication at a base station in accordance with examples as disclosed herein. The tracking area manager 1635 may be configured as or otherwise support a means for identifying that an aerial UE is connected to a cell within a tracking area, the tracking area including a first set of cells dedicated to aerial UEs and a second set of cells available to aerial UEs and non-aerial UEs. The mission status manager 1640 may be configured as or otherwise support a means for determining a mission status of the aerial UE. The pager 1645 may be configured as or otherwise support a means for paging the aerial UE via one or more cells in the tracking area based on the mission status of the aerial UE.

Figure 17:
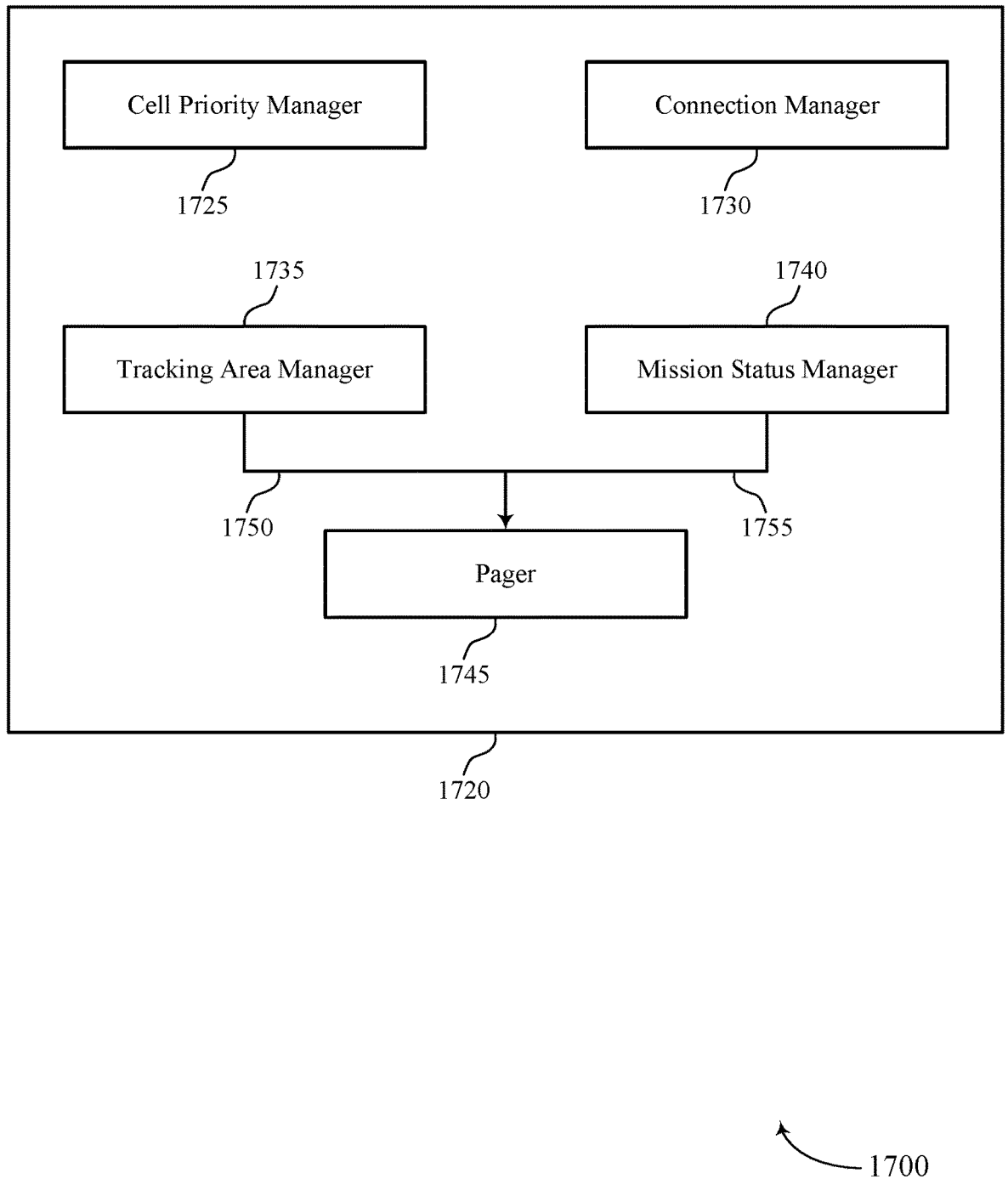
FIG. 17 shows a block diagram of a communications manager that supports cell selection, network selection, tracking area management, and paging for aerial operation in accordance with aspects of the present disclosure.

FIG. 17 shows a block diagram 1700 of a communications manager 1720 that supports cell selection, network selection, tracking area management, and paging for aerial operation in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of cell selection, network selection, tracking area management, and paging for aerial operation as described herein. For example, the communications manager 1720 may include a cell priority manager 1725, a connection manager 1730, a tracking area manager 1735, a mission status manager 1740, a pager 1745, or any combination thereof. Each of these components may communicate, directly or indirectly, with one another (e.g., via one or more buses).

The communications manager 1720 may support wireless communication at a base station in accordance with examples as disclosed herein. The cell priority manager 1725 may be configured as or otherwise support a means for transmitting system information indicating a priority of a cell for cell selection for aerial UEs. The connection manager 1730 may be configured as or otherwise support a means for connecting to an aerial UE for communications via the cell based on transmitting the system information indicating the priority of the cell.

In some examples, to support transmitting the system information indicating the priority of the cell, the cell priority manager 1725 may be configured as or otherwise support a means for transmitting the system information indicating a set of multiple priorities of the cell each corresponding to a different mission status of the aerial UE. In some examples, the different mission status of the aerial UE includes an aerial state, a ground state, a pre-flight state, or a post-flight state. In some examples, the priority of the cell for cell selection for aerial UEs includes a first priority, and the cell priority manager 1725 may be configured as or otherwise support a means for transmitting, in the system information, an indication of a second priority of the cell for cell selection for non-aerial UEs. In some examples, the priority of the cell corresponds to a level of support for aerial UEs at the cell. In some examples, the cell is dedicated to aerial UEs or available to aerial UEs and non-aerial UEs.

Additionally, or alternatively, the communications manager 1720 may support wireless communication at a base station in accordance with examples as disclosed herein. The tracking area manager 1735 may be configured as or otherwise support a means for identifying that an aerial UE is connected to a cell within a tracking area, the tracking area including a first set of cells dedicated to aerial UEs and a second set of cells available to aerial UEs and non-aerial UEs. The mission status manager 1740 may be configured as or otherwise support a means for determining a mission status of the aerial UE. The tracking area manager 1735 may pass an indication 1750 that the aerial UE is connected to the cell within the tracking area to the pager 1745, and the mission status manager 1740 may pass the mission status 1755 of the aerial UE to the pager 1745. The pager 1745 may be configured as or otherwise support a means for paging the aerial UE via one or more cells in the tracking area based on the mission status of the aerial UE.

In some examples, the pager 1745 may be configured as or otherwise support a means for paging the aerial UE via the first set of cells dedicated to aerial UEs in the tracking area if the aerial UE is in an aerial state. In some examples, the pager 1745 may be configured as or otherwise support a means for paging the aerial UE via the first set of cells and the second set of cells in the tracking area if the base station failed to receive a response to the paging via the first set of cells dedicated to aerial UEs. In some examples, the pager 1745 may be configured as or otherwise support a means for paging the aerial UE via the second set of cells in the tracking area if the base station failed to receive a response to the paging via the first set of cells dedicated to aerial UEs.

Figure 18:
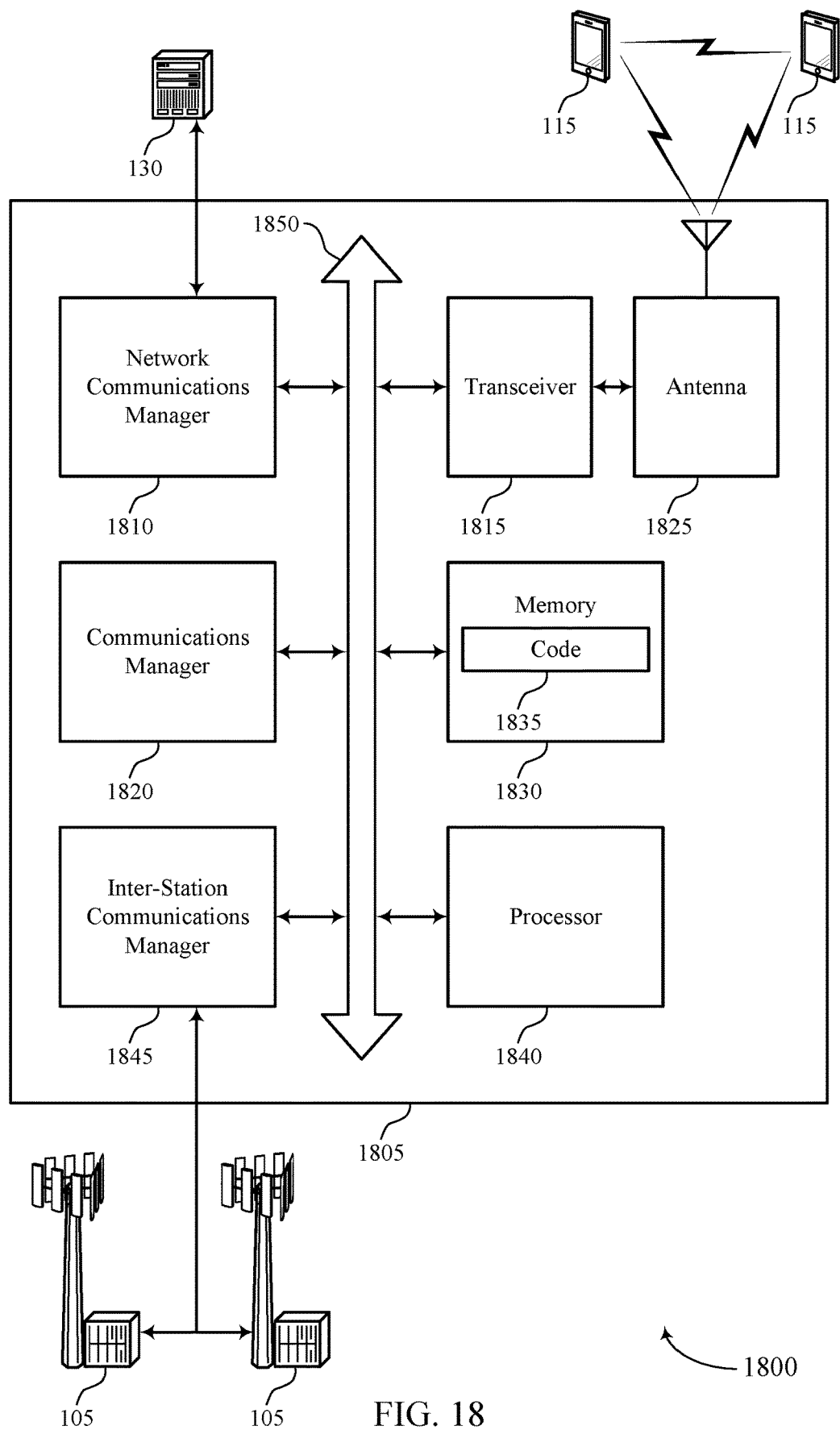
FIG. 18 shows a diagram of a system including a device that supports cell selection, network selection, tracking area management, and paging for aerial operation in accordance with aspects of the present disclosure.

FIG. 18 shows a diagram of a system 1800 including a device 1805 that supports cell selection, network selection, tracking area management, and paging for aerial operation in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting cell selection, network selection, tracking area management, and paging for aerial operation). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting system information indicating a priority of a cell for cell selection for aerial user equipments (UEs). The communications manager 1820 may be configured as or otherwise support a means for connecting to an aerial UE for communications via the cell based on transmitting the system information indicating the priority of the cell.

Additionally, or alternatively, the communications manager 1820 may support wireless communication at a base station in accordance with examples as disclosed herein. For example, the communications manager 1820 may be configured as or otherwise support a means for identifying that an aerial UE is connected to a cell within a tracking area, the tracking area including a first set of cells dedicated to aerial UEs and a second set of cells available to aerial UEs and non-aerial UEs. The communications manager 1820 may be configured as or otherwise support a means for determining a mission status of the aerial UE. The communications manager 1820 may be configured as or otherwise support a means for paging the aerial UE via one or more cells in the tracking area based on the mission status of the aerial UE.

By including or configuring the communications manager 1820 in accordance with examples as described herein, the device 1805 may support techniques for more efficient utilization of communication resources. In particular, the techniques described herein may allow for efficient cell selection, network selection, tracking area management, and paging for aerial operation such that aerial UEs may maximize the potential of resources dedicated to the aerial UEs.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of cell selection, network selection, tracking area management, and paging for aerial operation as described herein, or the processor 1840 and the memory 1830 may be otherwise configured to perform or support such operations.

Figure 19:
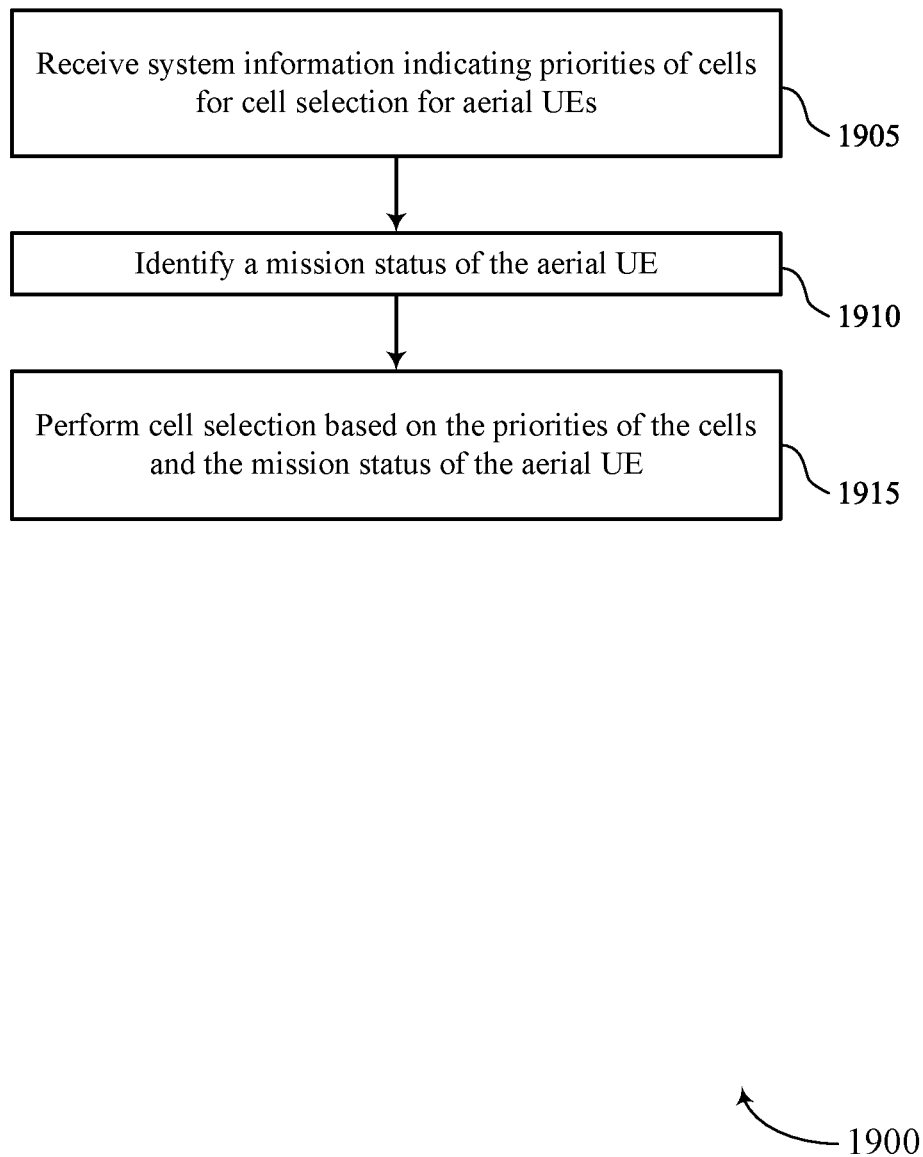
FIGS. 19 through 23 show flowcharts illustrating methods that support cell selection, network selection, tracking area management, and paging for aerial operation in accordance with aspects of the present disclosure.

FIG. 19 shows a flowchart illustrating a method 1900 that supports cell selection, network selection, tracking area management, and paging for aerial operation in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally. or alternatively, the UE may perform aspects of the described functions using special-purpose hardware.

At 1905, the method may include receiving first system information indicating a first priority of a first cell for cell selection for aerial UEs and receiving second system information indicating a second priority of a second cell for cell selection for aerial UEs. The operations of 1905 may be performed in accordance with examples as disclosed herein. In some examples, aspects of the operations of 1905 may be performed by a cell priority manager 1325 as described with reference to FIG. 13.

At 1910, the method may include identifying a mission status of the aerial UE. The operations of 1910 may be performed in accordance with examples as disclosed herein. In some examples, aspects of the operations of 1910 may be performed by a mission status manager 1330 as described with reference to FIG. 13.

At 1915, the method may include selecting the first cell or the second cell for communications based on the first priority of the first cell, the second priority of the second cell, and the mission status of the aerial UE. The operations of 1915 may be performed in accordance with examples as disclosed herein. In some examples, aspects of the operations of 1915 may be performed by a cell selector 1335 as described with reference to FIG. 13.

Figure 20:
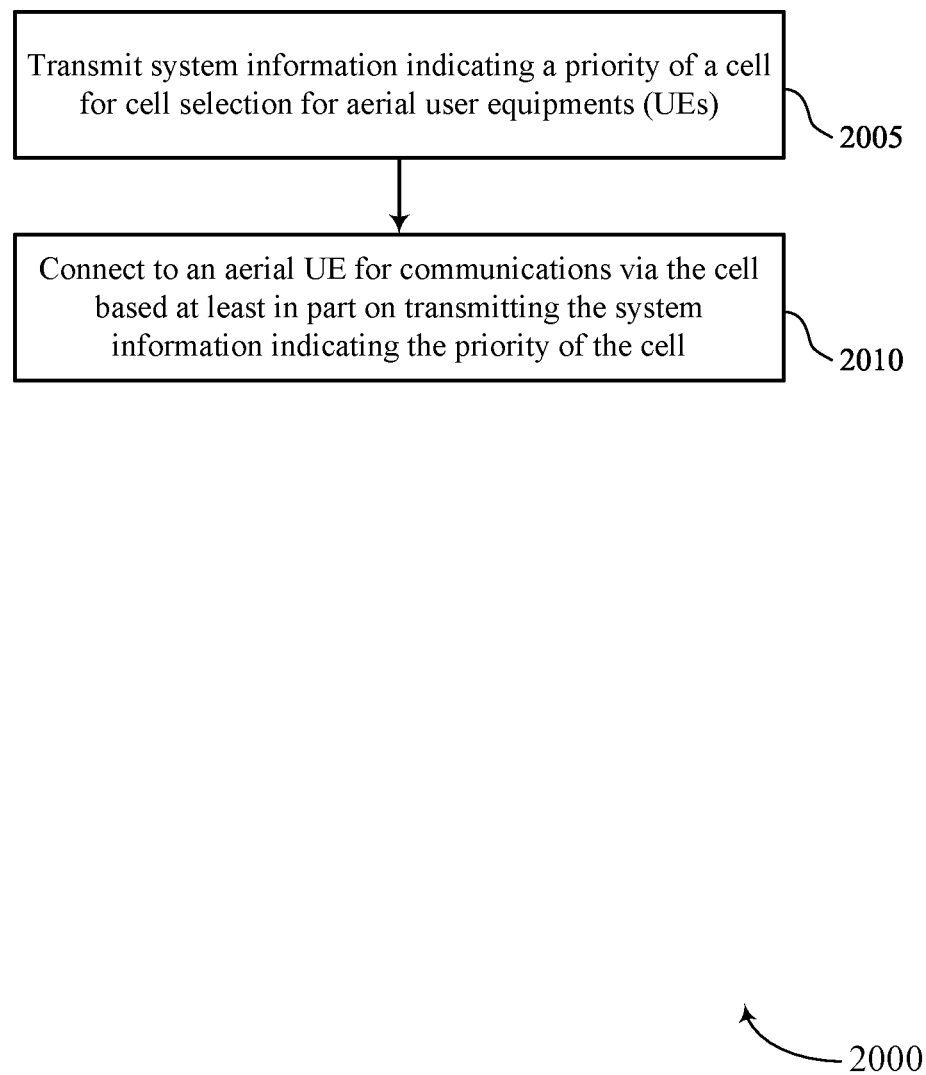

FIG. 20 shows a flowchart illustrating a method 2000 that supports cell selection, network selection, tracking area management, and paging for aerial operation in accordance with aspects of the present disclosure. The operations of the method 2000 may be implemented by a base station or its components as described herein. For example, the operations of the method 2000 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2005, the method may include transmitting system information indicating a priority of a cell for cell selection for aerial UEs. The operations of 2005 may be performed in accordance with examples as disclosed herein. In some examples, aspects of the operations of 2005 may be performed by a cell priority manager 1725 as described with reference to FIG. 17.

At 2010, the method may include connecting to an aerial UE for communications via the cell based on transmitting the system information indicating the priority of the cell. The operations of 2010 may be performed in accordance with examples as disclosed herein. In some examples, aspects of the operations of 2010 may be performed by a connection manager 1730 as described with reference to FIG. 17.

Figure 21:
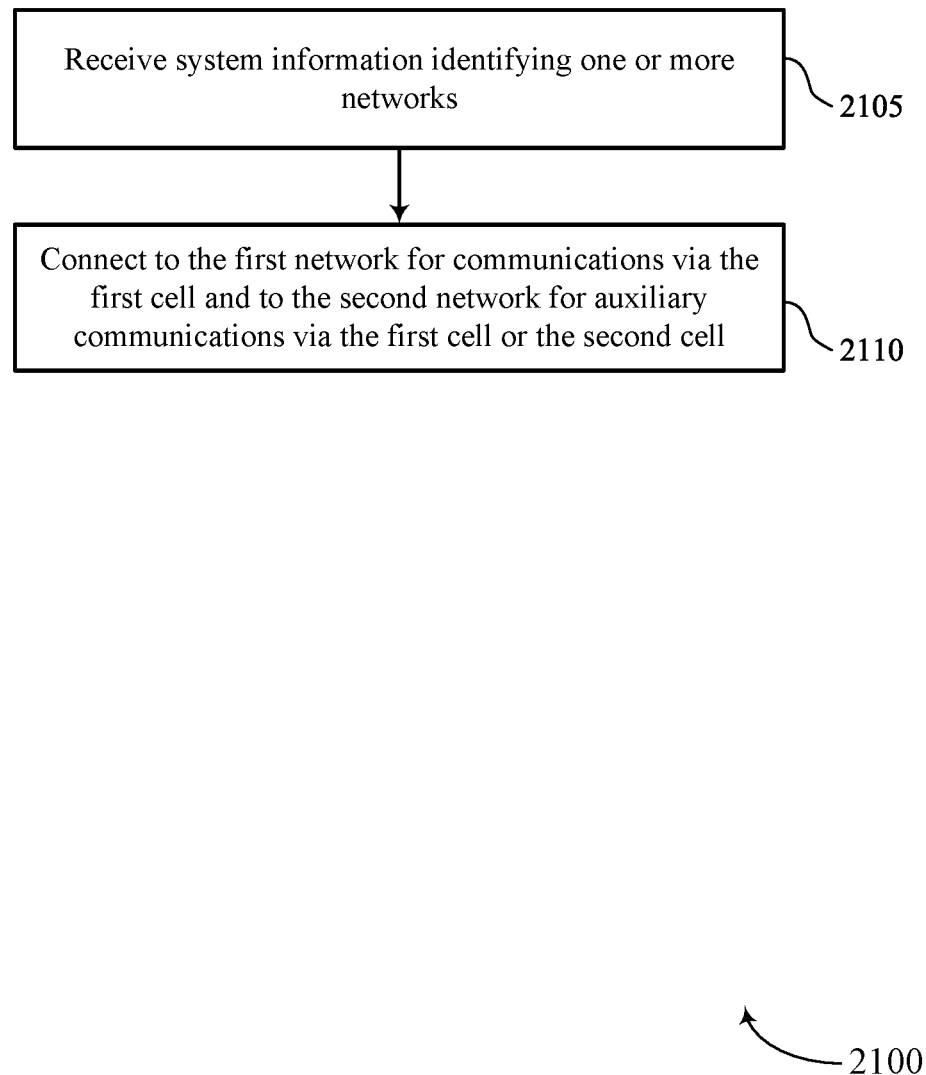

FIG. 21 shows a flowchart illustrating a method 2100 that supports cell selection, network selection, tracking area management, and paging for aerial operation in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2105, the method may include receiving, in first system information from a first cell, an indication of a first network dedicated to aerial UEs and receiving, in the first system information from the first cell or in second system information from a second cell, an indication of a second network available to aerial UEs and non-aerial UEs. The operations of 2110 may be performed in accordance with examples as disclosed herein. In some examples, aspects of the operations of 2110 may be performed by a network manager 1350 as described with reference to FIG. 13.

At 2110 the method may include connecting to the first network for communications via the first cell and to the second network for auxiliary communications via the first cell or the second cell. The operations of 2115 may be performed in accordance with examples as disclosed herein. In some examples, aspects of the operations of 2115 may be performed by a connection manager 1355 as described with reference to FIG. 13.

Figure 22:
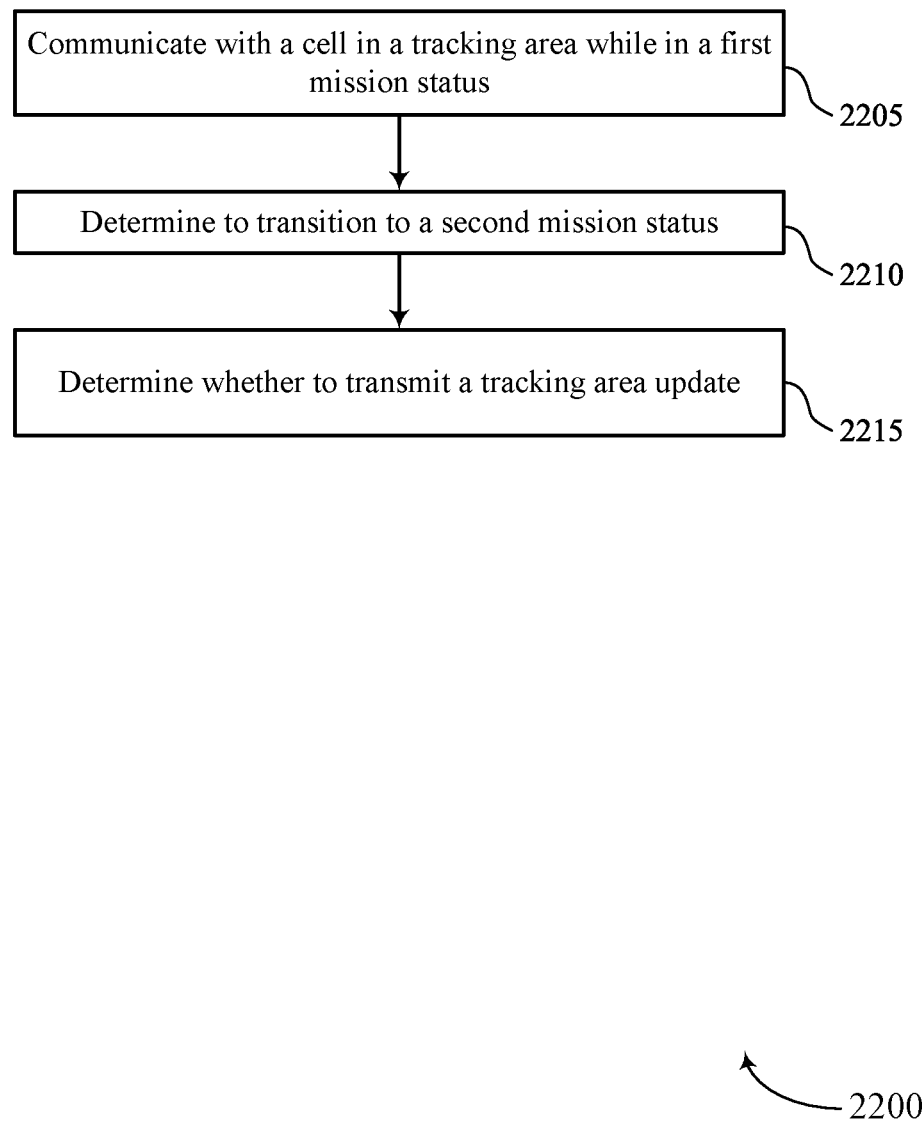

FIG. 22 shows a flowchart illustrating a method 2200 that supports cell selection, network selection, tracking area management, and paging for aerial operation in accordance with aspects of the present disclosure. The operations of the method 2200 may be implemented by a UE or its components as described herein. For example, the operations of the method 2200 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2205, the method may include communicating with a cell in a tracking area while in a first mission status. The operations of 2205 may be performed in accordance with examples as disclosed herein. In some examples, aspects of the operations of 2205 may be performed by a data manager 1340 as described with reference to FIG. 13.

At 2210, the method may include determining to transition to a second mission status. The operations of 2210 may be performed in accordance with examples as disclosed herein. In some examples, aspects of the operations of 2210 may be performed by a mission status manager 1330 as described with reference to FIG. 13.

At 2215, the method may include determining whether to transmit a TAU based on whether the tracking area supports the second mission status. The operations of 2215 may be performed in accordance with examples as disclosed herein. In some examples, aspects of the operations of 2215 may be performed by a TAU manager 1345 as described with reference to FIG. 13.

Figure 23:
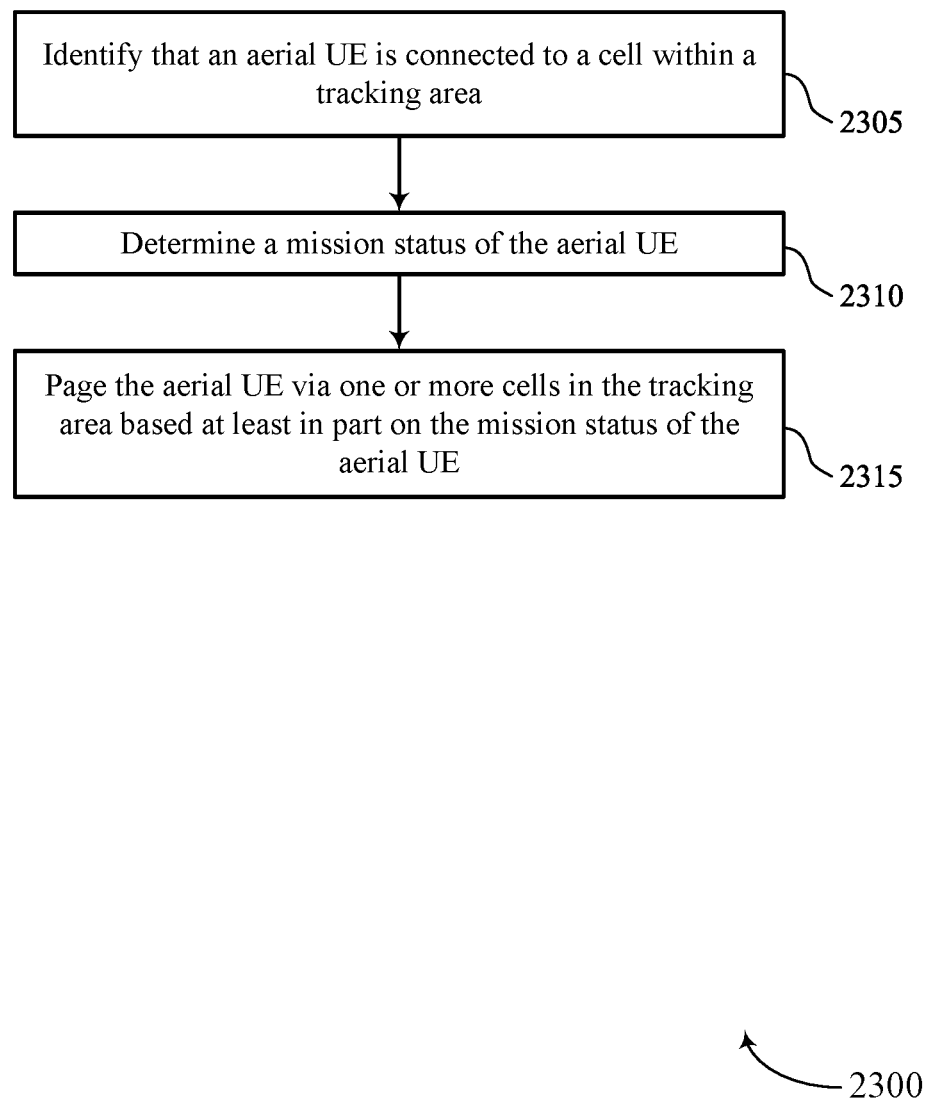

FIG. 23 shows a flowchart illustrating a method 2300 that supports cell selection, network selection, tracking area management, and paging for aerial operation in accordance with aspects of the present disclosure. The operations of the method 2300 may be implemented by a base station or its components as described herein. For example, the operations of the method 2300 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2305, the method may include identifying that an aerial UE is connected to a cell within a tracking area, the tracking area including a first set of cells dedicated to aerial UEs and a second set of cells available to aerial UEs and non-aerial UEs. The operations of 2305 may be performed in accordance with examples as disclosed herein. In some examples, aspects of the operations of 2305 may be performed by a tracking area manager 1735 as described with reference to FIG. 17.

At 2310, the method may include determining a mission status of the aerial UE. The operations of 2310 may be performed in accordance with examples as disclosed herein. In some examples, aspects of the operations of 2310 may be performed by a mission status manager 1740 as described with reference to FIG. 17.

At 2315, the method may include paging the aerial UE via one or more cells in the tracking area based on the mission status of the aerial UE. The operations of 2315 may be performed in accordance with examples as disclosed herein. In some examples, aspects of the operations of 2315 may be performed by a pager 1745 as described with reference to FIG. 17.

The following provides an overview of aspects of the present disclosure:

Aspect 1: A method for wireless communication at an aerial UE, comprising: receiving first system information indicating a first priority of a first cell for cell selection for aerial UEs; receiving second system information indicating a second priority of a second cell for cell selection for aerial UEs; identifying a mission status of the aerial UE; and selecting the first cell or the second cell for communications based at least in part on the first priority of the first cell, the second priority of the second cell, and the mission status of the aerial UE.

Aspect 2: The method of aspect 1, wherein receiving the first system information indicating the first priority of the first cell and the second system information indicating the second priority of the second cell comprises: receiving the first system information indicating a first plurality of priorities of the first cell each corresponding to a different mission status of the aerial UE; and receiving the second system information indicating a second plurality of priorities of the second cell each corresponding to a different mission status of the aerial UE.

Aspect 3: The method of aspect 2, further comprising: determining to use the first priority of the first cell from the first plurality of priorities of the first cell for cell selection based at least in part on the mission status of the aerial UE; and determining to use the second priority of the second cell of the second plurality of priorities of the second cell for cell selection based at least in part on the mission status of the aerial UE.

Aspect 4: The method of any of aspects 1 through 3, wherein the mission status of the aerial UE comprises an aerial state, a ground state, a pre-flight state, or a post-flight state.

Aspect 5: The method of any of aspects 1 through 4, wherein the first priority of the first cell corresponds to a first level of support for aerial UEs at the first cell, and the second priority of the second cell corresponds to a second level of support for aerial UEs at the second cell.

Aspect 6: The method of any of aspects 1 through 5, wherein the first cell or the second cell is dedicated to aerial UEs or available to aerial UEs and non-aerial UEs.

Aspect 7: A method for wireless communication at a base station, comprising: transmitting system information indicating a priority of a cell for cell selection for aerial UEs; and connecting to an aerial UE for communications via the cell based at least in part on transmitting the system information indicating the priority of the cell.

Aspect 8: The method of aspect 7, wherein transmitting the system information indicating the priority of the cell comprises: transmitting the system information indicating a plurality of priorities of the cell each corresponding to a different mission status of the aerial UE.

Aspect 9: The method of aspect 8, wherein the different mission status of the aerial UE comprises an aerial state, a ground state, a pre-flight state, or a post-flight state.

Aspect 10: The method of any of aspects 7 through 9, wherein the priority of the cell for cell selection for aerial UEs comprises a first priority, the method further comprising: transmitting, in the system information, an indication of a second priority of the cell for cell selection for non-aerial UEs.

Aspect 11: The method of any of aspects 7 through 10, wherein the priority of the cell corresponds to a level of support for aerial UEs at the cell.

Aspect 12: The method of any of aspects 7 through 11, wherein the cell is dedicated to aerial UEs or available to aerial UEs and non-aerial UEs.

Aspect 13: A method for wireless communication at an aerial UE, comprising: receiving, in first system information from a first cell, an indication of a first network dedicated to aerial UEs; receiving, in the first system information from the first cell or in second system information from a second cell, an indication of a second network available to aerial UEs and non-aerial UEs; and connecting to the first network for communications via the first cell and to the second network for auxiliary communications via the first cell or the second cell.

Aspect 14: The method of aspect 13, further comprising: determining that an amount of data for transmission to the first network via the first cell exceeds a threshold; and transmitting a first portion of the data to the first network via the first cell and a second portion of the data to the second network via the first cell or the second cell based at least in part on the determining.

Aspect 15: The method of aspect 14, wherein the first portion of the data comprises flight-operation data, and the second portion of the data comprises payload data.

Aspect 16: The method of any of aspects 13 through 15, further comprising: determining that an amount of data for transmission to the first network via the first cell is below a threshold; and transmitting the data to the first network via the first cell based at least in part on the determining.

Aspect 17: The method of aspect 16, wherein the data comprises flight-operation data and payload data.

Aspect 18: The method of any of aspects 13 through 17, further comprising: transmitting flight-operation data to the first network via the first cell and payload data to the second network via the second cell.

Aspect 19: The method of any of aspects 13 through 18, wherein connecting to the first network and to the second network is based at least in part on the aerial UE being in an aerial state.

Aspect 20: The method of any of aspects 13 through 19, wherein the first network dedicated to aerial UEs supports emergency calls by aerial UEs, non-aerial UEs, or both.

Aspect 21: The method of any of aspects 13 through 20, wherein the first system information comprises a first network identity list indicating the first network, and the second system information comprises a second network identity list indicating the second network.

Aspect 22: The method of any of aspects 13 through 21, wherein the first system information comprises a network identity list indicating the first network and the second network.

Aspect 23: The method of any of aspects 13 through 22, wherein the aerial UE comprises a first subscriber identity module and a second subscriber identity module, the method further comprising: communicating with the first network via the first cell using the first subscriber identity module at the aerial UE; and communicating with the second network via the first cell or the second cell using the second subscriber identity module at the aerial UE.

Aspect 24: The method of any of aspects 13 through 23, wherein the aerial UE comprises a single subscriber identity module, the method further comprising: communicating, over a split bearer, with the first network via the first cell and the second network via the second cell using the single subscriber identity module at the aerial UE.

Aspect 25: A method for wireless communication at an aerial UE, comprising: communicating with a cell in a tracking area while in a first mission status; determining to transition to a second mission status; and determining whether to transmit a tracking area update based at least in part on whether the tracking area supports the second mission status.

Aspect 26: The method of aspect 25, wherein the cell comprises a first cell, and the tracking area comprises a first tracking area, the method further comprising: connecting to a second cell in a second tracking area if the first tracking area fails to support the second mission status; and transmitting a tracking area update based at least in part on connecting to the second cell in the second tracking area.

Aspect 27: The method of aspect 26, wherein the first tracking area comprises cells available to aerial UEs and non-aerial UEs and the second tracking area comprises cells dedicated to aerial UEs.

Aspect 28: The method of any of aspects 25 through 27, further comprising: suppressing transmission of a tracking area update if the tracking area supports the second mission status.

Aspect 29: The method of aspect 28, wherein the tracking area comprises cells dedicated to aerial UEs.

Aspect 30: The method of any of aspects 25 through 29, wherein the tracking area comprises a first tracking area, and the cell is in the first tracking area and a second tracking area, the method further comprising: suppressing transmission of a tracking area update if the cell supports the second mission status.

Aspect 31: A method for wireless communication at a base station, comprising: identifying that an aerial UE is connected to a cell within a tracking area, the tracking area comprising a first set of cells dedicated to aerial UEs and a second set of cells available to aerial UEs and non-aerial UEs; determining a mission status of the aerial UE; and paging the aerial UE via one or more cells in the tracking area based at least in part on the mission status of the aerial UE.

Aspect 32: The method of aspect 31, further comprising: paging the aerial UE via the first set of cells dedicated to aerial UEs in the tracking area if the aerial UE is in an aerial state.

Aspect 33: The method of aspect 32, further comprising: paging the aerial UE via the first set of cells and the second set of cells in the tracking area if the base station failed to receive a response to the paging via the first set of cells dedicated to aerial UEs.

Aspect 34: The method of any of aspects 32 through 33, further comprising: paging the aerial UE via the second set of cells in the tracking area if the base station failed to receive a response to the paging via the first set of cells dedicated to aerial UEs.

Aspect 35: An apparatus for wireless communication at an aerial UE, comprising a processor; memory coupled with the processor; and instructions stored in the memory and executable by the processor to cause the apparatus to perform a method of any of aspects 1 through 6.

Aspect 36: An apparatus for wireless communication at an aerial UE, comprising at least one means for performing a method of any of aspects 1 through 6.

Aspect 37: A non-transitory computer-readable medium storing code for wireless communication at an aerial UE, the code comprising instructions executable by a processor to perform a method of any of aspects 1 through 6.

Aspect 38: An apparatus for wireless communication at a base station, comprising a processor; memory coupled with the processor; and instructions stored in the memory and executable by the processor to cause the apparatus to perform a method of any of aspects 7 through 12.

Aspect 39: An apparatus for wireless communication at a base station, comprising at least one means for performing a method of any of aspects 7 through 12.

Aspect 40: A non-transitory computer-readable medium storing code for wireless communication at a base station, the code comprising instructions executable by a processor to perform a method of any of aspects 7 through 12.

Aspect 41: An apparatus for wireless communication at an aerial UE, comprising a processor; memory coupled with the processor; and instructions stored in the memory and executable by the processor to cause the apparatus to perform a method of any of aspects 13 through 24.

Aspect 42: An apparatus for wireless communication at an aerial UE, comprising at least one means for performing a method of any of aspects 13 through 24.

Aspect 43: A non-transitory computer-readable medium storing code for wireless communication at an aerial UE, the code comprising instructions executable by a processor to perform a method of any of aspects 13 through 24.

Aspect 44: An apparatus for wireless communication at an aerial UE, comprising a processor; memory coupled with the processor; and instructions stored in the memory and executable by the processor to cause the apparatus to perform a method of any of aspects 25 through 30.

Aspect 45: An apparatus for wireless communication at an aerial UE, comprising at least one means for performing a method of any of aspects 25 through 30.

Aspect 46: A non-transitory computer-readable medium storing code for wireless communication at an aerial UE, the code comprising instructions executable by a processor to perform a method of any of aspects 25 through 30.

Aspect 47: An apparatus for wireless communication at a base station, comprising a processor; memory coupled with the processor; and instructions stored in the memory and executable by the processor to cause the apparatus to perform a method of any of aspects 31 through 34.

Aspect 48: An apparatus for wireless communication at a base station, comprising at least one means for performing a method of any of aspects 31 through 34.

Aspect 49: A non-transitory computer-readable medium storing code for wireless communication at a base station, the code comprising instructions executable by a processor to perform a method of any of aspects 31 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at an aerial user equipment (UE), comprising:
    receiving, in first system information from a first cell, an indication of a first network dedicated to aerial UEs;
    receiving, in the first system information from the first cell or in second system information from a second cell, an indication of a second network available to aerial UEs and non-aerial UEs;
    connecting to the first network for communications via the first cell and to the second network for auxiliary communications via the first cell or the second cell; and
    transmitting flight-operation data to the first network via the first cell and payload data to the second network via the second cell.

2. The method of claim 1, wherein connecting to the first network and to the second network is based at least in part on the aerial UE being in an aerial state.

3. The method of claim 1, wherein the first network dedicated to aerial UEs supports emergency calls by aerial UEs, non-aerial UEs, or both.

4. The method of claim 1, wherein the first system information comprises a first network identity list indicating the first network, and the second system information comprises a second network identity list indicating the second network.

5. The method of claim 1, wherein the first system information comprises a network identity list indicating the first network and the second network.

6. The method of claim 1, wherein the aerial UE comprises a first subscriber identity module and a second subscriber identity module, the method further comprising:
    communicating with the first network via the first cell using the first subscriber identity module at the aerial UE; and
    communicating with the second network via the first cell or the second cell using the second subscriber identity module at the aerial UE.

7. The method of claim 1, wherein the aerial UE comprises a single subscriber identity module, the method further comprising:
    communicating, over a split bearer, with the first network via the first cell and the second network via the second cell using the single subscriber identity module at the aerial UE.

8. A method for wireless communication at an aerial user equipment (UE), comprising:
    receiving, in first system information from a first cell, an indication of a first network dedicated to aerial UEs;
    receiving, in the first system information from the first cell or in second system information from a second cell, an indication of a second network available to aerial UEs and non-aerial UEs;
    connecting to the first network for communications via the first cell and to the second network for auxiliary communications via the first cell or the second cell;
    determining that an amount of data for transmission to the first network via the first cell exceeds a threshold; and
    transmitting a first portion of the data to the first network via the first cell and a second portion of the data to the second network via the first cell or the second cell based at least in part on the determining, wherein the first portion of the data comprises flight-operation data, and the second portion of the data comprises payload data.

9. A method for wireless communication at an aerial user equipment (UE), comprising:
    receiving, in first system information from a first cell, an indication of a first network dedicated to aerial UEs;

receiving, in the first system information from the first cell or in second system information from a second cell, an indication of a second network available to aerial UEs and non-aerial UEs;
connecting to the first network for communications via the first cell and to the second network for auxiliary communications via the first cell or the second cell;
determining that an amount of data for transmission to the first network via the first cell is below a threshold; and
transmitting the data to the first network via the first cell based at least in part on the determining, wherein the data comprises flight-operation data and payload data.

10. An apparatus for wireless communication at an aerial user equipment (UE), comprising:
a processor; and
a memory coupled with the processor, the memory comprising instructions executable by the processor to cause the apparatus to:
receive, in first system information from a first cell, an indication of a first network dedicated to aerial UEs;
receive, in the first system information from the first cell or in second system information from a second cell, an indication of a second network available to aerial UEs and non-aerial UEs;
connect to the first network for communications via the first cell and to the second network for auxiliary communications via the first cell or the second cell; and
transmit flight-operation data to the first network via the first cell and payload data to the second network via the second cell.

11. The apparatus of claim 10, wherein connecting to the first network and to the second network is based at least in part on the aerial UE being in an aerial state.

12. The apparatus of claim 10, wherein the first network dedicated to aerial UEs supports emergency calls by aerial UEs, non-aerial UEs, or both.

13. The apparatus of claim 10, wherein the first system information comprises a first network identity list indicating the first network, and the second system information comprises a second network identity list indicating the second network.

14. The apparatus of claim 10, wherein the first system information comprises a network identity list indicating the first network and the second network.

15. The apparatus of claim 10, wherein the aerial UE comprises a first subscriber identity module and a second subscriber identity module, and wherein the instructions are further executable by the processor to cause the apparatus to:
communicate with the first network via the first cell using the first subscriber identity module at the aerial UE; and
communicate with the second network via the first cell or the second cell using the second subscriber identity module at the aerial UE.

16. The apparatus of claim 10, wherein the aerial UE comprises a single subscriber identity module, and wherein the instructions are further executable by the processor to cause the apparatus to:
communicate, over a split bearer, with the first network via the first cell and the second network via the second cell using the single subscriber identity module at the aerial UE.

17. An apparatus for wireless communication at an aerial user equipment (UE), comprising:
a processor; and
a memory coupled with the processor, the memory comprising instructions executable by the processor to cause the apparatus to:
receive, in first system information from a first cell, an indication of a first network dedicated to aerial UEs;
receive, in the first system information from the first cell or in second system information from a second cell, an indication of a second network available to aerial UEs and non-aerial UEs;
connect to the first network for communications via the first cell and to the second network for auxiliary communications via the first cell or the second cell;
determine that an amount of data for transmission to the first network via the first cell exceeds a threshold; and
transmit a first portion of the data to the first network via the first cell and a second portion of the data to the second network via the first cell or the second cell based at least in part on the determining, wherein the first portion of the data comprises flight-operation data, and the second portion of the data comprises payload data.

18. An apparatus for wireless communication at an aerial user equipment (UE), comprising:
a processor; and
a memory coupled with the processor, the memory comprising instructions executable by the processor to cause the apparatus to:
receive, in first system information from a first cell, an indication of a first network dedicated to aerial UEs;
receive, in the first system information from the first cell or in second system information from a second cell, an indication of a second network available to aerial UEs and non-aerial UEs;
connect to the first network for communications via the first cell and to the second network for auxiliary communications via the first cell or the second cell;
determine that an amount of data for transmission to the first network via the first cell is below a threshold; and
transmit the data to the first network via the first cell based at least in part on the determining, wherein the data comprises flight-operation data and payload data.

19. A non-transitory computer-readable medium storing code for wireless communication at an aerial user equipment (UE), the code comprising instructions executable by a processor to:
receive, in first system information from a first cell, an indication of a first network dedicated to aerial UEs;
receive, in the first system information from the first cell or in second system information from a second cell, an indication of a second network available to aerial UEs and non-aerial UEs;
connect to the first network for communications via the first cell and to the second network for auxiliary communications via the first cell or the second cell; and
transmit flight-operation data to the first network via the first cell and payload data to the second network via the second cell.

20. The non-transitory computer-readable medium of claim 19, wherein connecting to the first network and to the second network is based at least in part on the aerial UE being in an aerial state.

21. The non-transitory computer-readable medium of claim 19, wherein the first network dedicated to aerial UEs supports emergency calls by aerial UEs, non-aerial UEs, or both.

22. The non-transitory computer-readable medium of claim 19, wherein the first system information comprises a first network identity list indicating the first network, and the second system information comprises a second network identity list indicating the second network.

23. A non-transitory computer-readable medium storing code for wireless communication at an aerial user equipment (UE), the code comprising instructions executable by a processor to:
- receive, in first system information from a first cell, an indication of a first network dedicated to aerial UEs;
- receive, in the first system information from the first cell or in second system information from a second cell, an indication of a second network available to aerial UEs and non-aerial UEs;
- connect to the first network for communications via the first cell and to the second network for auxiliary communications via the first cell or the second cell;
- determine that an amount of data for transmission to the first network via the first cell exceeds a threshold; and
- transmit a first portion of the data to the first network via the first cell and a second portion of the data to the second network via the first cell or the second cell based at least in part on the determining, wherein the first portion of the data comprises flight-operation data, and the second portion of the data comprises payload data.

24. A non-transitory computer-readable medium storing code for wireless communication at an aerial user equipment (UE), the code comprising instructions executable by a processor to:
- receive, in first system information from a first cell, an indication of a first network dedicated to aerial UEs;
- receive, in the first system information from the first cell or in second system information from a second cell, an indication of a second network available to aerial UEs and non-aerial UEs;
- connect to the first network for communications via the first cell and to the second network for auxiliary communications via the first cell or the second cell;
- determine that an amount of data for transmission to the first network via the first cell is below a threshold; and
- transmit the data to the first network via the first cell based at least in part on the determining, wherein the data comprises flight-operation data and payload data.

25. An apparatus for wireless communication at an aerial user equipment (UE), comprising:
- means for receiving, in first system information from a first cell, an indication of a first network dedicated to aerial UEs;
- means for receiving, in the first system information from the first cell or in second system information from a second cell, an indication of a second network available to aerial UEs and non-aerial UEs;
- means for connecting to the first network for communications via the first cell and to the second network for auxiliary communications via the first cell or the second cell; and
- means for transmitting flight-operation data to the first network via the first cell and payload data to the second network via the second cell.

26. An apparatus for wireless communication at an aerial user equipment (UE), comprising:
- means for receiving, in first system information from a first cell, an indication of a first network dedicated to aerial UEs;
- means for receiving, in the first system information from the first cell or in second system information from a second cell, an indication of a second network available to aerial UEs and non-aerial UEs;
- means for connecting to the first network for communications via the first cell and to the second network for auxiliary communications via the first cell or the second cell;
- means for determining that an amount of data for transmission to the first network via the first cell exceeds a threshold; and
- means for transmitting a first portion of the data to the first network via the first cell and a second portion of the data to the second network via the first cell or the second cell based at least in part on the determining, wherein the first portion of the data comprises flight-operation data, and the second portion of the data comprises payload data.

27. An apparatus for wireless communication at an aerial user equipment (UE), comprising:
- means for receiving, in first system information from a first cell, an indication of a first network dedicated to aerial UEs;
- means for receiving, in the first system information from the first cell or in second system information from a second cell, an indication of a second network available to aerial UEs and non-aerial UEs;
- means for connecting to the first network for communications via the first cell and to the second network for auxiliary communications via the first cell or the second cell;
- means for determining that an amount of data for transmission to the first network via the first cell is below a threshold; and
- means for transmitting the data to the first network via the first cell based at least in part on the determining, wherein the data comprises flight-operation data and payload data.

* * * * *